(12) United States Patent
Lohr et al.

(10) Patent No.: US 8,512,195 B2
(45) Date of Patent: Aug. 20, 2013

(54) INFINITELY VARIABLE TRANSMISSIONS, CONTINUOUSLY VARIABLE TRANSMISSIONS, METHODS, ASSEMBLIES, SUBASSEMBLIES, AND COMPONENTS THEREFOR

(75) Inventors: Charles B. Lohr, Austin, TX (US); John W. Sherrill, Round Rock, TX (US); Brad P. Pohl, Leander, TX (US); Robert Dawson, Cedar Park, TX (US); Corey Pew, Austin, TX (US)

(73) Assignee: Fallbrook Intellectual Property Company LLC, Cedar Park, TX (US)

( * ) Notice: Subject to any disclaimer, the term of this patent is extended or adjusted under 35 U.S.C. 154(b) by 289 days.

(21) Appl. No.: 13/035,683

(22) Filed: Feb. 25, 2011

(65) Prior Publication Data

US 2011/0218072 A1    Sep. 8, 2011

Related U.S. Application Data

(60) Provisional application No. 61/310,224, filed on Mar. 3, 2010.

(51) Int. Cl.
*F16H 15/48* (2006.01)
*F16H 15/26* (2006.01)

(52) U.S. Cl.
USPC .............................. 475/189; 476/38

(58) Field of Classification Search
USPC ................ 475/183, 185, 189, 190, 192, 196, 475/197; 476/36, 38; 74/89.23
See application file for complete search history.

(56) References Cited

U.S. PATENT DOCUMENTS

| 719,595 | A | 2/1903 | Huss |
| 1,121,210 | A | 12/1914 | Techel |
| 1,175,677 | A | 3/1916 | Barnes |
| 1,207,985 | A | 12/1916 | Null et al. |

(Continued)

FOREIGN PATENT DOCUMENTS

| CH | 118064 | 12/1926 |
| CN | 1157379 A | 8/1997 |

(Continued)

OTHER PUBLICATIONS

International Search Report and Written Opinion dated May 30, 2011 for PCT Application No. PCT/US2011/026756.

(Continued)

*Primary Examiner* — Roger Pang
(74) *Attorney, Agent, or Firm* — Knobbe Martens Olson & Bear LLP

(57) ABSTRACT

Inventive embodiments are directed to components, subassemblies, systems, and/or methods for infinitely variable transmissions (IVT). In one embodiment, a control system is adapted to facilitate a change in the ratio of an IVT. In another embodiment, a control system includes a carrier member configured to have a number of radially offset slots. Various inventive carrier members and carrier drivers can be used to facilitate shifting the ratio of an IVT. In some embodiments, the traction planet assemblies include planet axles configured to cooperate with the carrier members. In one embodiment, the carrier member is configured to rotate and apply a skew condition to each of the planet axles. In some embodiments, a carrier member is operably coupled to a carrier driver. In some embodiments, the carrier member is configured to couple to a source of rotational power. Among other things, shift control interfaces for an IVT are disclosed.

20 Claims, 22 Drawing Sheets

(56) References Cited

U.S. PATENT DOCUMENTS

| | | |
|---|---|---|
| 1,380,006 A | 5/1921 | Nielson |
| 1,390,971 A | 9/1921 | Samain |
| 1,558,222 A | 10/1925 | Beetow |
| 1,629,902 A | 5/1927 | Arter et al. |
| 1,686,446 A | 10/1928 | Gilman |
| 1,774,254 A | 8/1930 | Daukus |
| 1,793,571 A | 2/1931 | Vaughn |
| 1,847,027 A | 2/1932 | Thomsen et al. |
| 1,858,696 A | 5/1932 | Weiss |
| 1,865,102 A | 6/1932 | Hayes |
| 1,903,228 A | 3/1933 | Thomson |
| 1,978,439 A | 10/1934 | Sharpe |
| 2,030,203 A | 2/1936 | Gove et al. |
| 2,060,884 A | 11/1936 | Madle |
| 2,086,491 A | 7/1937 | Dodge |
| 2,100,629 A | 11/1937 | Chilton |
| 2,109,845 A | 3/1938 | Madle |
| 2,112,763 A | 3/1938 | Cloudsley |
| 2,134,225 A | 10/1938 | Christiansen |
| 2,152,796 A | 4/1939 | Erban |
| 2,209,254 A | 7/1940 | Ahnger |
| 2,259,933 A | 10/1941 | Holloway |
| 2,325,502 A | 7/1943 | Georges |
| 2,469,653 A | 5/1949 | Kopp |
| 2,480,968 A | 9/1949 | Ronai |
| 2,596,538 A | 5/1952 | Dicke |
| 2,597,849 A | 5/1952 | Alfredeen |
| 2,675,713 A | 4/1954 | Acker |
| 2,730,904 A | 1/1956 | Rennerfelt |
| 2,748,614 A | 6/1956 | Weisel |
| 2,868,038 A | 1/1959 | Billeter |
| 2,959,070 A | 1/1959 | Flinn |
| 2,874,592 A | 2/1959 | Oehrli |
| 2,883,883 A | 4/1959 | Chillson |
| 2,913,932 A | 11/1959 | Oehru |
| 2,931,234 A | 4/1960 | Hayward |
| 2,931,235 A | 4/1960 | Hayward |
| 2,949,800 A | 8/1960 | Neuschotz |
| 2,959,063 A | 11/1960 | Perry |
| 2,959,972 A | 11/1960 | Madson |
| 2,964,959 A | 12/1960 | Beck |
| 3,008,061 A | 11/1961 | Mims et al. |
| 3,048,056 A | 8/1962 | Wolfram |
| 3,051,020 A | 8/1962 | Hartupee |
| 3,087,348 A | 4/1963 | Kraus |
| 3,163,050 A | 12/1964 | Kraus |
| 3,176,542 A | 4/1965 | Monch |
| 3,184,983 A | 5/1965 | Kraus |
| 3,211,364 A | 10/1965 | Wentling et al. |
| 3,216,283 A | 11/1965 | General |
| 3,248,960 A | 5/1966 | Schottler |
| 3,273,468 A | 9/1966 | Allen |
| 3,280,646 A | 10/1966 | Lemieux |
| 3,292,443 A | 12/1966 | Felix |
| 3,340,895 A | 9/1967 | Osgood, Jr. et al. |
| 3,407,687 A | 10/1968 | Hayashi |
| 3,440,895 A | 4/1969 | Fellows |
| 3,464,281 A | 9/1969 | Hiroshi et al. |
| 3,477,315 A | 11/1969 | Macks |
| 3,487,726 A | 1/1970 | Burnett |
| 3,487,727 A | 1/1970 | Gustafsson |
| 3,574,289 A | 4/1971 | Scheiter et al. |
| 3,661,404 A | 5/1972 | Bossaer |
| 3,695,120 A | 10/1972 | Titt |
| 3,707,888 A | 1/1973 | Schottler |
| 3,727,473 A | 4/1973 | Bayer |
| 3,727,474 A | 4/1973 | Fullerton |
| 3,736,803 A | 6/1973 | Horowitz et al. |
| 3,768,715 A | 10/1973 | Tout |
| 3,800,607 A | 4/1974 | Zurcher |
| 3,802,284 A | 4/1974 | Sharpe et al. |
| 3,810,398 A | 5/1974 | Kraus |
| 3,820,416 A | 6/1974 | Kraus |
| 3,866,985 A | 2/1975 | Whitehurst |
| 3,891,235 A | 6/1975 | Shelly |
| 3,934,493 A | 1/1976 | Hillyer |
| 3,954,282 A | 5/1976 | Hege |
| 3,996,807 A | 12/1976 | Adams |
| 4,103,514 A | 8/1978 | Grosse-Entrup |
| 4,159,653 A | 7/1979 | Koivunen |
| 4,169,609 A | 10/1979 | Zampedro |
| 4,177,683 A | 12/1979 | Moses |
| 4,227,712 A | 10/1980 | Dick |
| 4,345,486 A | 8/1982 | Olesen |
| 4,369,667 A | 1/1983 | Kemper |
| 4,382,188 A | 5/1983 | Cronin |
| 4,391,156 A | 7/1983 | Tibbals |
| 4,459,873 A | 7/1984 | Black |
| 4,464,952 A | 8/1984 | Stubbs |
| 4,468,984 A | 9/1984 | Castelli et al. |
| 4,494,524 A | 1/1985 | Wagner |
| 4,496,051 A | 1/1985 | Ortner |
| 4,526,255 A | 7/1985 | Hennessey et al. |
| 4,560,369 A | 12/1985 | Hattori |
| 4,574,649 A | 3/1986 | Seol |
| 4,585,429 A | 4/1986 | Marier |
| 4,630,839 A | 12/1986 | Seol |
| 4,700,581 A | 10/1987 | Tibbals, Jr. |
| 4,713,976 A | 12/1987 | Wilkes |
| 4,717,368 A | 1/1988 | Yamaguchi et al. |
| 4,735,430 A | 4/1988 | Tomkinson |
| 4,744,261 A | 5/1988 | Jacobson |
| 4,756,211 A | 7/1988 | Fellows |
| 4,781,663 A | 11/1988 | Reswick |
| 4,838,122 A | 6/1989 | Takamiya et al. |
| 4,856,374 A | 8/1989 | Kreuzer |
| 4,869,130 A | 9/1989 | Wiecko |
| 4,881,925 A | 11/1989 | Hattori |
| 4,900,046 A | 2/1990 | Aranceta-Angoitia |
| 4,909,101 A | 3/1990 | Terry |
| 4,918,344 A | 4/1990 | Chikamori et al. |
| 4,964,312 A | 10/1990 | Kraus |
| 5,006,093 A | 4/1991 | Itoh et al. |
| 5,020,384 A | 6/1991 | Kraus |
| 5,033,322 A | 7/1991 | Nakano |
| 5,037,361 A | 8/1991 | Takahashi |
| 5,069,655 A | 12/1991 | Schievelbusch |
| 5,121,654 A | 6/1992 | Fasce |
| 5,125,677 A | 6/1992 | Ogilvie et al. |
| 5,156,412 A | 10/1992 | Meguerditchian |
| 5,230,258 A | 7/1993 | Nakano |
| 5,236,211 A | 8/1993 | Meguerditchian |
| 5,236,403 A | 8/1993 | Schievelbusch |
| 5,267,920 A | 12/1993 | Hibi |
| 5,273,501 A | 12/1993 | Schievelbusch |
| 5,318,486 A | 6/1994 | Lutz |
| 5,330,396 A | 7/1994 | Lohr et al. |
| 5,355,749 A | 10/1994 | Obara et al. |
| 5,375,865 A | 12/1994 | Terry, Sr. |
| 5,379,661 A | 1/1995 | Nakano |
| 5,383,677 A | 1/1995 | Thomas |
| 5,387,000 A | 2/1995 | Sato |
| 5,401,221 A | 3/1995 | Fellows et al. |
| 5,451,070 A | 9/1995 | Lindsay et al. |
| 5,489,003 A | 2/1996 | Ohyama et al. |
| 5,508,574 A | 4/1996 | Vlock |
| 5,562,564 A | 10/1996 | Folino |
| 5,564,998 A | 10/1996 | Fellows |
| 5,601,301 A | 2/1997 | Liu |
| 5,607,373 A | 3/1997 | Ochiai et al. |
| 5,645,507 A | 7/1997 | Hathaway |
| 5,651,750 A | 7/1997 | Imanishi et al. |
| 5,664,636 A | 9/1997 | Ikuma et al. |
| 5,690,346 A | 11/1997 | Keskitalo |
| 5,746,676 A | 5/1998 | Kawase et al. |
| 5,755,303 A | 5/1998 | Yamamoto et al. |
| 5,799,541 A | 9/1998 | Arbeiter |
| 5,823,052 A | 10/1998 | Nobumoto |
| 5,846,155 A | 12/1998 | Taniguchi et al. |
| 5,888,160 A | 3/1999 | Miyata et al. |
| 5,899,827 A | 5/1999 | Nakano et al. |
| 5,902,207 A | 5/1999 | Sugihara |
| 5,967,933 A | 10/1999 | Valdenaire |
| 5,984,826 A | 11/1999 | Nakano |

| | | | | | | |
|---|---|---|---|---|---|---|
| 6,006,151 | A | 12/1999 | Graf | 7,112,158 B2 | 9/2006 | Miller |
| 6,015,359 | A | 1/2000 | Kunii | 7,112,159 B2 | 9/2006 | Miller et al. |
| 6,019,701 | A | 2/2000 | Mori et al. | 7,125,297 B2 | 10/2006 | Miller et al. |
| 6,029,990 | A | 2/2000 | Busby | 7,131,930 B2 | 11/2006 | Miller et al. |
| 6,042,132 | A | 3/2000 | Suenaga et al. | 7,140,999 B2 | 11/2006 | Miller |
| 6,045,477 | A | 4/2000 | Schmidt | 7,147,586 B2 | 12/2006 | Miller et al. |
| 6,045,481 | A | 4/2000 | Kumagai | 7,153,233 B2 | 12/2006 | Miller et al. |
| 6,053,833 | A | 4/2000 | Masaki | 7,156,770 B2 | 1/2007 | Miller |
| 6,053,841 | A | 4/2000 | Kolde et al. | 7,160,220 B2 | 1/2007 | Shinojima et al. |
| 6,066,067 | A | 5/2000 | Greenwood | 7,160,222 B2 | 1/2007 | Miller |
| 6,071,210 | A | 6/2000 | Kato | 7,163,485 B2 | 1/2007 | Miller |
| 6,076,846 | A | 6/2000 | Clardy | 7,163,486 B2 | 1/2007 | Miller et al. |
| 6,079,726 | A | 6/2000 | Busby | 7,166,052 B2 | 1/2007 | Miller et al. |
| 6,095,940 | A | 8/2000 | Ai et al. | 7,166,056 B2 | 1/2007 | Miller et al. |
| 6,099,431 | A | 8/2000 | Hoge et al. | 7,166,057 B2 | 1/2007 | Miller et al. |
| 6,113,513 | A | 9/2000 | Itoh et al. | 7,166,058 B2 | 1/2007 | Miller et al. |
| 6,119,539 | A | 9/2000 | Papanicolaou | 7,169,076 B2 | 1/2007 | Miller et al. |
| 6,119,800 | A | 9/2000 | McComber | 7,172,529 B2 | 2/2007 | Miller et al. |
| 6,159,126 | A | 12/2000 | Oshidari | 7,175,564 B2 | 2/2007 | Miller |
| 6,171,210 | B1 | 1/2001 | Miyata et al. | 7,175,565 B2 | 2/2007 | Miller et al. |
| 6,174,260 | B1 | 1/2001 | Tsukada et al. | 7,175,566 B2 | 2/2007 | Miller et al. |
| 6,186,922 | B1 | 2/2001 | Bursal et al. | 7,192,381 B2 | 3/2007 | Miller et al. |
| 6,217,473 | B1 | 4/2001 | Ueda et al. | 7,197,915 B2 | 4/2007 | Luh et al. |
| 6,241,636 | B1 | 6/2001 | Miller | 7,198,582 B2 | 4/2007 | Miller et al. |
| 6,243,638 | B1 | 6/2001 | Abo et al. | 7,198,583 B2 | 4/2007 | Miller et al. |
| 6,251,038 | B1 | 6/2001 | Ishikawa et al. | 7,198,584 B2 | 4/2007 | Miller et al. |
| 6,258,003 | B1 | 7/2001 | Hirano et al. | 7,198,585 B2 | 4/2007 | Miller et al. |
| 6,311,113 | B1 | 10/2001 | Danz et al. | 7,201,693 B2 | 4/2007 | Miller et al. |
| 6,312,358 | B1 | 11/2001 | Goi et al. | 7,201,694 B2 | 4/2007 | Miller et al. |
| 6,322,475 | B2 | 11/2001 | Miller | 7,201,695 B2 | 4/2007 | Miller et al. |
| 6,325,386 | B1 | 12/2001 | Shoge | 7,204,777 B2 | 4/2007 | Miller et al. |
| 6,358,178 | B1 | 3/2002 | Wittkopp | 7,214,159 B2 | 5/2007 | Miller et al. |
| 6,375,412 | B1 | 4/2002 | Dial | 7,217,215 B2 | 5/2007 | Miller et al. |
| 6,390,946 | B1 | 5/2002 | Hibi et al. | 7,217,216 B2 | 5/2007 | Inoue |
| 6,406,399 | B1 | 6/2002 | Ai | 7,217,219 B2 | 5/2007 | Miller |
| 6,419,608 | B1 | 7/2002 | Miller | 7,217,220 B2 | 5/2007 | Careau et al. |
| 6,425,838 | B1 | 7/2002 | Matsubara et al. | 7,232,395 B2 | 6/2007 | Miller et al. |
| 6,461,268 | B1 | 10/2002 | Milner | 7,234,873 B2 | 6/2007 | Kato et al. |
| 6,482,094 | B2 | 11/2002 | Kefes | 7,235,031 B2 | 6/2007 | Miller et al. |
| 6,492,785 | B1 | 12/2002 | Kasten et al. | 7,238,136 B2 | 7/2007 | Miller et al. |
| 6,494,805 | B2 | 12/2002 | Ooyama et al. | 7,238,137 B2 | 7/2007 | Miller et al. |
| 6,499,373 | B2 | 12/2002 | Van Cor | 7,238,138 B2 | 7/2007 | Miller et al. |
| 6,514,175 | B2 | 2/2003 | Taniguchi et al. | 7,238,139 B2 | 7/2007 | Roethler et al. |
| 6,532,890 | B2 | 3/2003 | Chen | 7,246,672 B2 | 7/2007 | Shirai et al. |
| 6,551,210 | B2 | 4/2003 | Miller | 7,250,018 B2 | 7/2007 | Miller et al. |
| 6,575,047 | B2 | 6/2003 | Reik et al. | 7,261,663 B2 | 8/2007 | Miller et al. |
| 6,659,901 | B2 | 12/2003 | Sakai et al. | 7,275,610 B2 | 10/2007 | Kuang et al. |
| 6,672,418 | B1 | 1/2004 | Makino | 7,285,068 B2 | 10/2007 | Hosoi |
| 6,676,559 | B2 | 1/2004 | Miller | 7,288,042 B2 | 10/2007 | Miller et al. |
| 6,679,109 | B2 | 1/2004 | Gierling et al. | 7,288,043 B2 | 10/2007 | Shioiri et al. |
| 6,682,432 | B1 | 1/2004 | Shinozuka | 7,320,660 B2 | 1/2008 | Miller |
| 6,689,012 | B2 | 2/2004 | Miller | 7,322,901 B2 | 1/2008 | Miller et al. |
| 6,723,016 | B2 | 4/2004 | Sumi | 7,347,801 B2 | 3/2008 | Guenter et al. |
| 6,805,654 | B2 | 10/2004 | Nishii | 7,384,370 B2 | 6/2008 | Miller |
| 6,849,020 | B2 | 2/2005 | Sumi | 7,393,300 B2 | 7/2008 | Miller et al. |
| 6,931,316 | B2 | 8/2005 | Joe et al. | 7,393,302 B2 | 7/2008 | Miller |
| 6,932,739 | B2 | 8/2005 | Miyata et al. | 7,393,303 B2 | 7/2008 | Miller |
| 6,942,593 | B2 | 9/2005 | Nishii et al. | 7,395,731 B2 | 7/2008 | Miller et al. |
| 6,945,903 | B2 | 9/2005 | Miller | 7,396,209 B2 | 7/2008 | Miller et al. |
| 6,949,049 | B2 | 9/2005 | Miller | 7,402,122 B2 | 7/2008 | Miller |
| 6,958,029 | B2 | 10/2005 | Inoue | 7,410,443 B2 | 8/2008 | Miller |
| 6,991,575 | B2 | 1/2006 | Inoue | 7,419,451 B2 | 9/2008 | Miller |
| 6,991,579 | B2 | 1/2006 | Kobayashi et al. | 7,422,541 B2 | 9/2008 | Miller |
| 7,011,600 | B2 | 3/2006 | Miller et al. | 7,422,546 B2 | 9/2008 | Miller et al. |
| 7,011,601 | B2 | 3/2006 | Miller | 7,427,253 B2 | 9/2008 | Miller |
| 7,014,591 | B2 | 3/2006 | Miller | 7,431,677 B2 | 10/2008 | Miller et al. |
| 7,029,418 | B2 | 4/2006 | Taketsuna et al. | 7,452,297 B2 | 11/2008 | Miller et al. |
| 7,032,914 | B2 | 4/2006 | Miller | 7,455,611 B2 | 11/2008 | Miller et al. |
| 7,036,620 | B2 | 5/2006 | Miller et al. | 7,455,617 B2 | 11/2008 | Miller et al. |
| 7,044,884 | B2 | 5/2006 | Miller | 7,462,123 B2 | 12/2008 | Miller et al. |
| 7,063,640 | B2 | 6/2006 | Miller | 7,462,127 B2 | 12/2008 | Miller et al. |
| 7,074,007 | B2 | 7/2006 | Miller | 7,470,210 B2 | 12/2008 | Miller et al. |
| 7,074,154 | B2 | 7/2006 | Miller | 7,481,736 B2 | 1/2009 | Miller et al. |
| 7,074,155 | B2 | 7/2006 | Miller | 7,510,499 B2 | 3/2009 | Miller et al. |
| 7,077,777 | B2 | 7/2006 | Miyata et al. | 7,540,818 B2 | 6/2009 | Miller et al. |
| 7,086,979 | B2 | 8/2006 | Frenken | 7,547,264 B2 | 6/2009 | Usoro |
| 7,086,981 | B2 | 8/2006 | Ali et al. | 7,574,935 B2 | 8/2009 | Rohs et al. |
| 7,094,171 | B2 | 8/2006 | Inoue | 7,591,755 B2 | 9/2009 | Petrzik et al. |
| 7,111,860 | B1 | 9/2006 | Grimaldos | 7,727,115 B2 | 6/2010 | Serkh |

| | | |
|---|---|---|
| 7,762,920 B2 | 7/2010 | Smithson et al. |
| 7,883,442 B2 | 2/2011 | Miller et al. |
| 7,885,747 B2 | 2/2011 | Miller et al. |
| 7,909,727 B2 | 3/2011 | Smithson et al. |
| 7,959,533 B2 | 6/2011 | Nichols et al. |
| 7,963,880 B2 | 6/2011 | Smithson et al. |
| 7,967,719 B2 | 6/2011 | Smithson et al. |
| 7,976,426 B2 | 7/2011 | Smithson et al. |
| 8,142,323 B2 | 3/2012 | Tsuchiya et al. |
| 8,167,759 B2 * | 5/2012 | Pohl et al. ............... 475/189 |
| 2001/0008192 A1 | 7/2001 | Morisawa |
| 2001/0044361 A1 | 11/2001 | Taniguchi et al. |
| 2002/0019285 A1 | 2/2002 | Henzler |
| 2002/0028722 A1 | 3/2002 | Sakai et al. |
| 2002/0045511 A1 | 4/2002 | Geiberger et al. |
| 2003/0015358 A1 | 1/2003 | Abe et al. |
| 2003/0015874 A1 | 1/2003 | Abe et al. |
| 2003/0022753 A1 | 1/2003 | Mizuno et al. |
| 2003/0036456 A1 | 2/2003 | Skrabs |
| 2003/0216216 A1 | 11/2003 | Inoue et al. |
| 2003/0221892 A1 | 12/2003 | Matsumoto et al. |
| 2004/0058772 A1 | 3/2004 | Inoue et al. |
| 2004/0082421 A1 | 4/2004 | Wafzig |
| 2004/0119345 A1 | 6/2004 | Takano |
| 2004/0204283 A1 | 10/2004 | Inoue |
| 2005/0037876 A1 | 2/2005 | Unno et al. |
| 2005/0227809 A1 | 10/2005 | Bitzer et al. |
| 2006/0052204 A1 | 3/2006 | Eckert et al. |
| 2006/0084549 A1 | 4/2006 | Smithson et al. |
| 2006/0108956 A1 | 5/2006 | Clark |
| 2006/0111212 A9 | 5/2006 | Ai et al. |
| 2006/0180363 A1 | 8/2006 | Uchisasai |
| 2006/0234822 A1 | 10/2006 | Morscheck et al. |
| 2007/0004552 A1 | 1/2007 | Matsudaira et al. |
| 2007/0004556 A1 | 1/2007 | Rohs et al. |
| 2007/0049450 A1 | 3/2007 | Miller |
| 2007/0142161 A1 | 6/2007 | Miller |
| 2007/0149342 A1 | 6/2007 | Guenter et al. |
| 2007/0155567 A1 | 7/2007 | Miller et al. |
| 2008/0032852 A1 | 2/2008 | Smithson et al. |
| 2008/0032854 A1 | 2/2008 | Smithson et al. |
| 2008/0034585 A1 | 2/2008 | Smithson et al. |
| 2008/0034586 A1 | 2/2008 | Smithson et al. |
| 2008/0039269 A1 | 2/2008 | Smithson et al. |
| 2008/0039272 A1 | 2/2008 | Smithson et al. |
| 2008/0039273 A1 | 2/2008 | Smithson et al. |
| 2008/0039274 A1 | 2/2008 | Smithson et al. |
| 2008/0039276 A1 | 2/2008 | Smithson et al. |
| 2008/0039277 A1 | 2/2008 | Smithson et al. |
| 2008/0081728 A1 | 4/2008 | Faulring et al. |
| 2008/0121487 A1 | 5/2008 | Miller et al. |
| 2008/0125281 A1 | 5/2008 | Miller et al. |
| 2008/0125282 A1 | 5/2008 | Miller et al. |
| 2008/0132373 A1 | 6/2008 | Miller et al. |
| 2008/0132377 A1 | 6/2008 | Miller et al. |
| 2008/0139363 A1 | 6/2008 | Williams |
| 2008/0141809 A1 | 6/2008 | Miller et al. |
| 2008/0141810 A1 | 6/2008 | Miller et al. |
| 2008/0146403 A1 | 6/2008 | Miller |
| 2008/0146404 A1 | 6/2008 | Miller |
| 2008/0161151 A1 | 7/2008 | Miller |
| 2008/0188345 A1 | 8/2008 | Miller |
| 2008/0200300 A1 | 8/2008 | Smithson et al. |
| 2008/0236319 A1 | 10/2008 | Nichols et al. |
| 2008/0248917 A1 | 10/2008 | Nichols et al. |
| 2008/0261771 A1 | 10/2008 | Nichols et al. |
| 2008/0305920 A1 | 12/2008 | Nishii et al. |
| 2009/0107454 A1 | 4/2009 | Hiyoshi et al. |
| 2009/0164076 A1 | 6/2009 | Vasiliotis et al. |
| 2009/0280949 A1 | 11/2009 | Lohr |
| 2009/0312145 A1 | 12/2009 | Pohl et al. |
| 2010/0056322 A1 | 3/2010 | Thomassy |
| 2010/0093479 A1 | 4/2010 | Carter et al. |
| 2010/0093480 A1 | 4/2010 | Pohl et al. |
| 2010/0093485 A1 | 4/2010 | Pohl et al. |
| 2010/0131164 A1 | 5/2010 | Carter et al. |
| 2010/0264620 A1 | 10/2010 | Miles et al. |
| 2010/0267510 A1 | 10/2010 | Nichols et al. |
| 2011/0088503 A1 | 4/2011 | Armstrong et al. |
| 2011/0105274 A1 | 5/2011 | Lohr et al. |
| 2011/0127096 A1 | 6/2011 | Schneidewind |
| 2011/0172050 A1 | 7/2011 | Nichols et al. |
| 2011/0218072 A1 | 9/2011 | Lohr et al. |
| 2011/0230297 A1 | 9/2011 | Shiina et al. |
| 2011/0319222 A1 | 12/2011 | Ogawa et al. |
| 2012/0035016 A1 | 2/2012 | Miller et al. |
| 2012/0043841 A1 | 2/2012 | Miller |
| 2012/0238386 A1 | 9/2012 | Pohl et al. |
| 2012/0258839 A1 | 10/2012 | Smithson et al. |
| 2012/0309579 A1 | 12/2012 | Miller et al. |

FOREIGN PATENT DOCUMENTS

| | | |
|---|---|---|
| DE | 498 701 | 5/1930 |
| DE | 1171692 | 6/1964 |
| DE | 2 310880 | 9/1974 |
| DE | 2 136 243 | 1/1975 |
| DE | 2436496 | 2/1975 |
| DE | 39 40 919 A1 | 6/1991 |
| DE | 19851738 | 5/2000 |
| DE | 10155372 A1 | 5/2003 |
| EP | 0 432 742 | 12/1990 |
| EP | 0528382 | 2/1993 |
| EP | 635639 A1 | 1/1995 |
| EP | 0638741 | 2/1995 |
| EP | 0976956 | 2/2000 |
| EP | 1136724 | 9/2001 |
| EP | 1366978 | 3/2003 |
| EP | 1811202 A1 | 7/2007 |
| FR | 620375 | 4/1927 |
| FR | 2590638 | 5/1987 |
| GB | 391448 | 4/1933 |
| GB | 592320 | 9/1947 |
| GB | 906 002 A | 9/1962 |
| GB | 919430 A | 2/1963 |
| GB | 1132473 | 11/1968 |
| GB | 1165545 | 10/1969 |
| GB | 1 376 057 | 12/1974 |
| GB | 2031822 | 4/1980 |
| GB | 2 035 482 | 6/1980 |
| GB | 2 080 452 | 8/1982 |
| JP | 44-1098 | 1/1944 |
| JP | 42-2843 | 2/1967 |
| JP | 42-2844 | 2/1967 |
| JP | 47-29762 | 11/1972 |
| JP | 48-54371 | 7/1973 |
| JP | 49-12742 | 3/1974 |
| JP | 50-114581 | 9/1975 |
| JP | 51-25903 | 8/1976 |
| JP | 51-150380 | 12/1976 |
| JP | 47-20535 | 8/1977 |
| JP | 53 048166 | 1/1978 |
| JP | 55-135259 | 4/1979 |
| JP | 58065361 | 4/1983 |
| JP | 59069565 | 4/1984 |
| JP | 60-247011 | 12/1985 |
| JP | 61-144466 | 7/1986 |
| JP | 61-173722 | 10/1986 |
| JP | 63-219953 | 9/1988 |
| JP | 63219953 | 9/1988 |
| JP | 63-160465 | 10/1988 |
| JP | 02157483 | 6/1990 |
| JP | 02271142 | 6/1990 |
| JP | 04-166619 | 6/1992 |
| JP | 04-272553 | 9/1992 |
| JP | 52-35481 | 9/1993 |
| JP | 7-42799 | 2/1995 |
| JP | 7-139600 | 5/1995 |
| JP | 08170706 A | 7/1996 |
| JP | 09024743 A | 1/1997 |
| JP | 09-089064 | 3/1997 |
| JP | 411063130 | 3/1999 |
| JP | 11-257479 | 9/1999 |
| JP | 2000-46135 | 2/2000 |
| JP | 2001-27298 | 1/2001 |
| JP | 2001521109 A | 11/2001 |
| JP | 2002-147558 | 5/2002 |
| JP | 2002-250421 | 6/2002 |
| JP | 2003-028257 | 1/2003 |

| | | |
|---|---|---|
| JP | 2003-56662 | 2/2003 |
| JP | 2003-524119 | 8/2003 |
| JP | 2003-336732 | 11/2003 |
| JP | 2004162652 A | 6/2004 |
| JP | 8-247245 | 9/2004 |
| JP | 2005/240928 A | 9/2005 |
| JP | 2006015025 | 1/2006 |
| JP | 2007-535715 | 12/2007 |
| JP | 2008-002687 | 1/2008 |
| JP | 03-149442 | 1/2009 |
| JP | 2010069005 | 4/2010 |
| NE | 98467 | 7/1961 |
| TW | 582363 | 4/2004 |
| TW | 590955 | 6/2004 |
| WO | WO 01/73319 | 10/2001 |
| WO | WO 03100294 | 12/2003 |
| WO | WO 2005/083305 | 9/2005 |
| WO | WO 2007/077502 | 7/2007 |
| WO | WO 2008/002457 | 1/2008 |
| WO | WO 2009/157920 | 12/2009 |
| WO | WO2010/017242 | 2/2010 |
| WO | WO 2010/024809 | 3/2010 |
| WO | WO 2010/044778 | 4/2010 |
| WO | WO 2011/101991 | 8/2011 |

OTHER PUBLICATIONS

Thomassy: An Engineering Approach to Simulating Traction EHL. CVT-Hybrid International Conference Mecc/Maastricht/The Netherlands, Nov. 17-19, 2010, p. 97.

\* cited by examiner

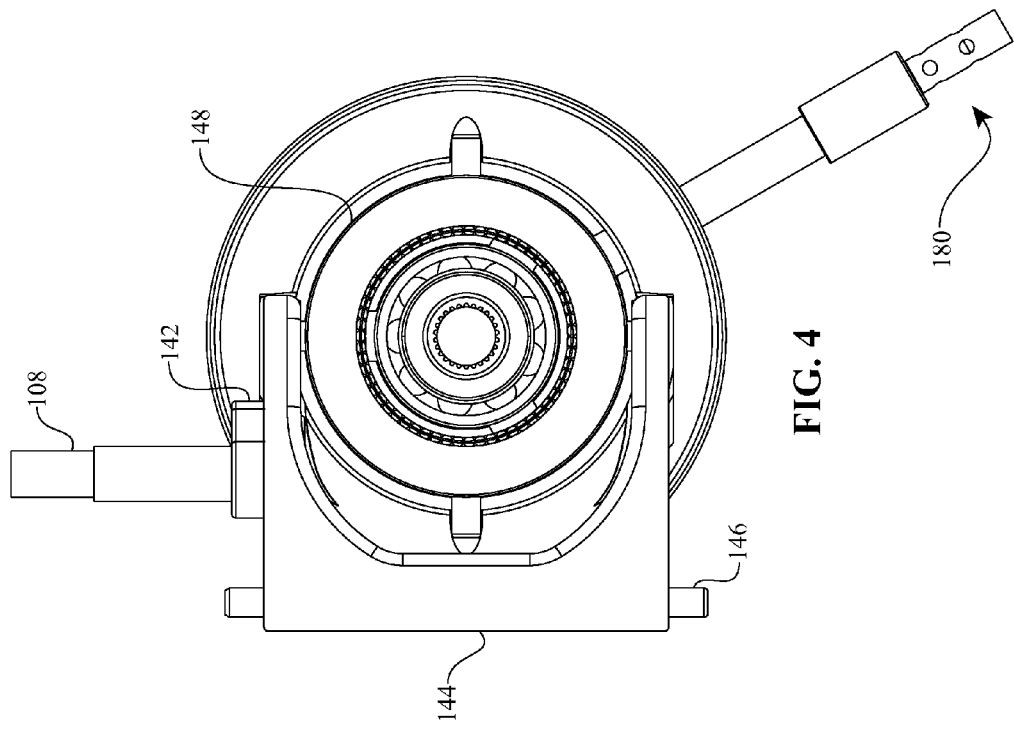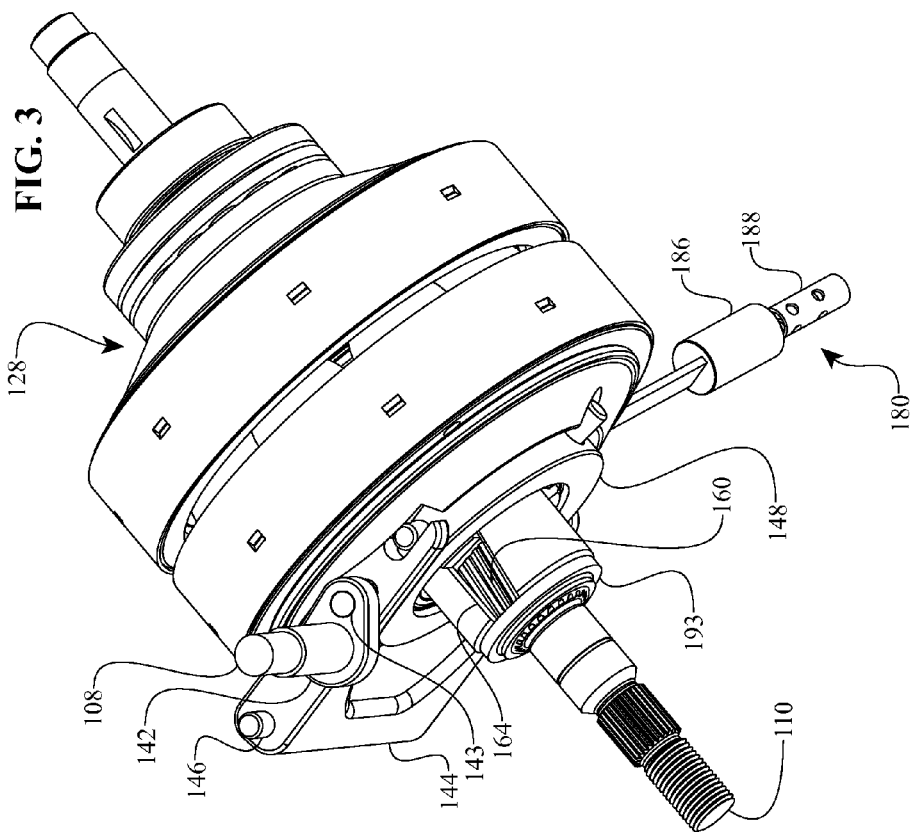

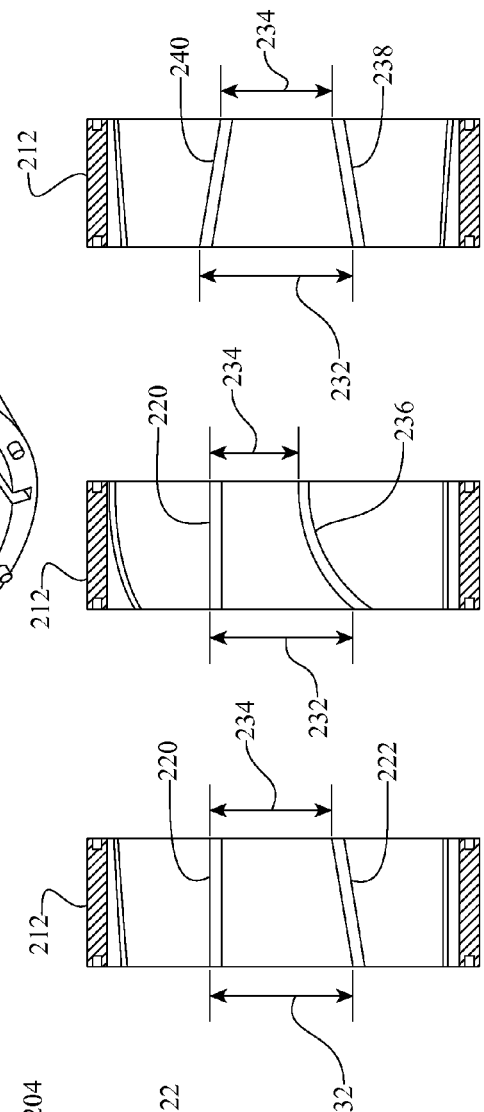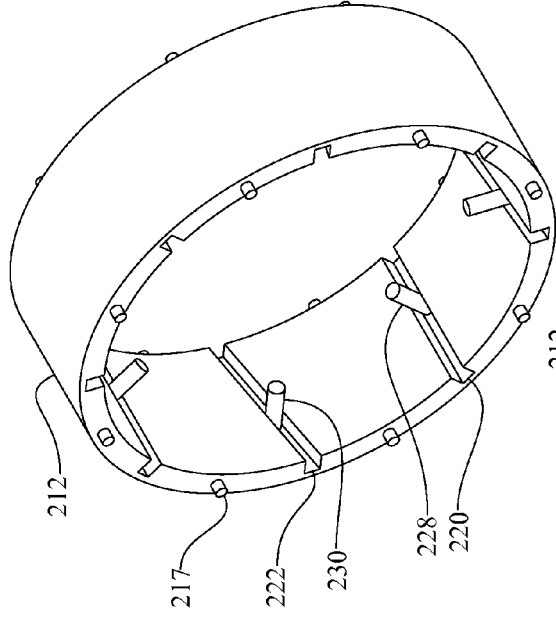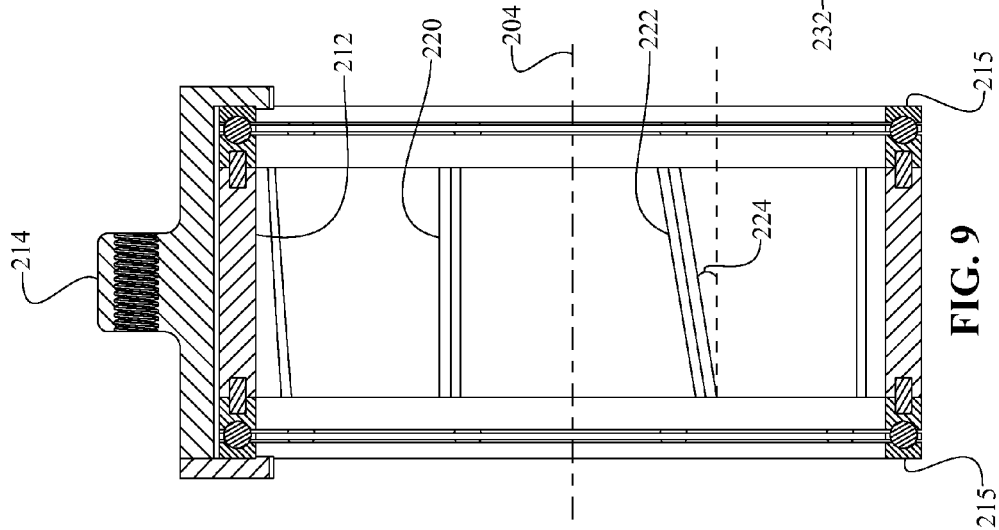

VIEW A-A

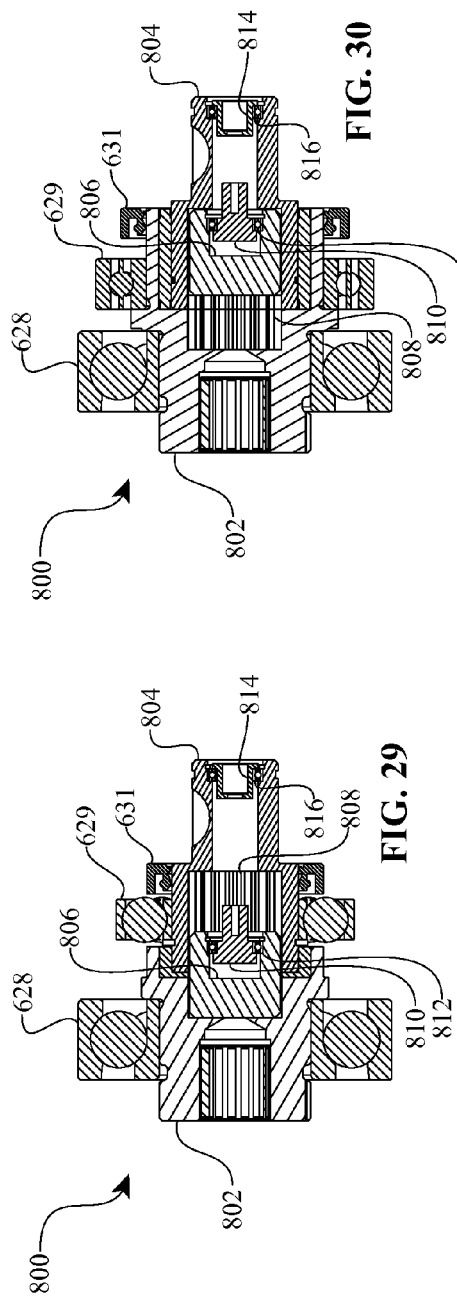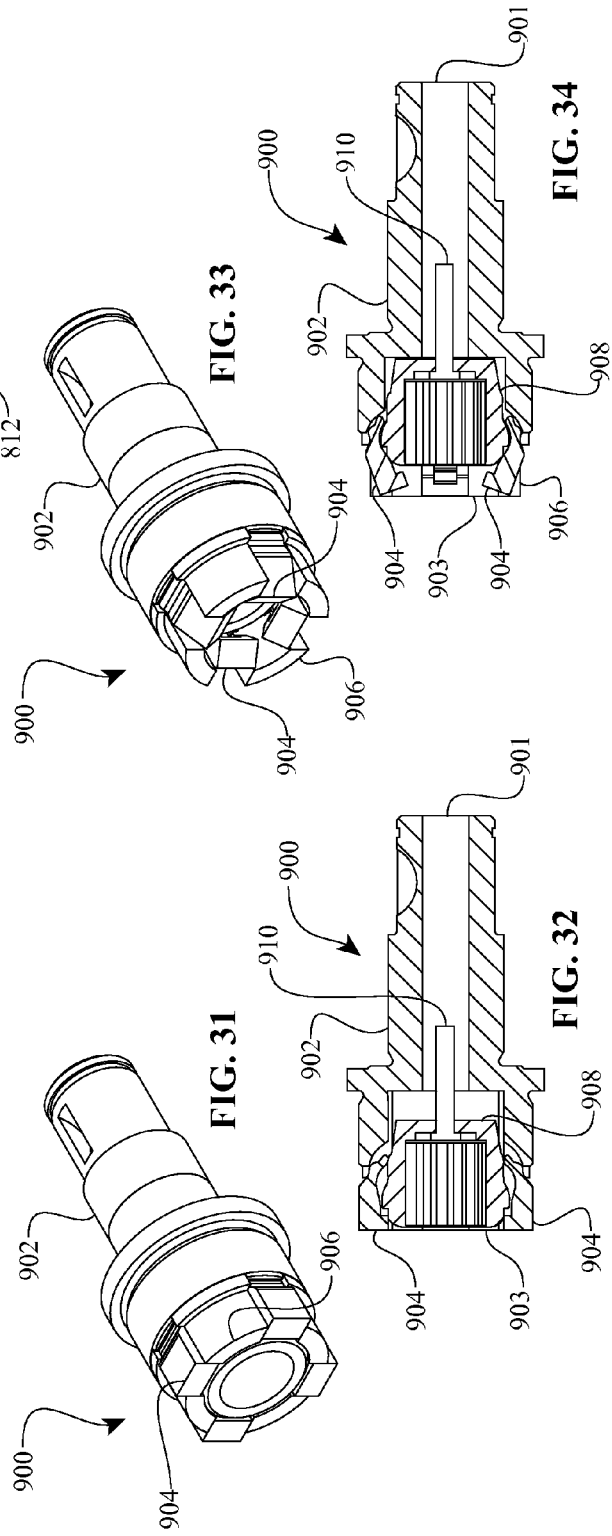

Section B-B

INFINITELY VARIABLE TRANSMISSIONS, CONTINUOUSLY VARIABLE TRANSMISSIONS, METHODS, ASSEMBLIES, SUBASSEMBLIES, AND COMPONENTS THEREFOR

CROSS REFERENCE TO RELATED APPLICATIONS

This application claims the benefit of U.S. Provisional Patent Application No. 61/310,224 filed on Mar. 3, 2010, which is hereby incorporated by reference in its entirety.

BACKGROUND OF THE INVENTION

1. Field of the Invention

The field of the invention relates generally to transmissions, and more particularly the inventive embodiments related to continuously variable transmissions (CVTs) and infinitely variable transmissions (IVTs).

2. Description of the Related Art

In certain systems, power is characterized by torque and rotational speed. More specifically, power in these systems is generally defined as the product of torque and rotational speed. Typically, a transmission couples to a power input that provides an input torque at an input speed. The transmission also couples to a load that demands an output torque and output speed, which may differ from the input torque and the input speed. Typically, and generalizing, a prime mover provides the power input to the transmission, and a driven device or load receives the power output from the transmission. A primary function of the transmission is to modulate the power input in such a way to deliver a power output to the driven device at a desired ratio of input speed to output speed ("speed ratio").

Some mechanical drives include transmissions of the type known as stepped, discrete, or fixed ratio. These transmissions are configured to provide speed ratios that are discrete or stepped in a given speed ratio range. For example, such a transmission may provide for a speed ratio of 1:2, 1:1, or 2:1, but such a transmission cannot deliver intermediate speed ratios such as 1:1.5, 1:1.75, 1.5:1, or 1.75:1, for example. Other drives include a type of transmission generally known as a continuously variable transmission (or "CVT"), which includes a continuously variable variator. A CVT, in contrast to a stepped transmission, is configured to provide every fractional ratio in a given speed ratio range. For example, in the speed ratio range mentioned above, a CVT is generally capable of delivering any desired speed ratio between 1:2 and 2:1, which would include speed ratios such as 1:1.9, 1:1.1, 1.3:1, 1.7:1, etc. Yet other drives employ an infinitely variable transmission (or "IVT"). An IVT, like a CVT, is capable of producing every speed ratio in a given ratio range. However, in contrast to a CVT, the IVT is configured to deliver a zero output speed (a "powered zero" state) with a steady input speed. Hence, given the definition of speed ratio as the ratio of input speed to output speed, the IVT is capable of delivering an infinite set of speed ratios, and consequently, the IVT is not limited to a given ratio range. It should be noted that some transmissions use a continuously variable variator coupled to other gearing and/or clutches in a split powered arrangement to produce IVT functionality. However, as used here, the term IVT is primarily understood as comprehending an infinitely variable variator which produces IVT functionality without being necessarily coupled to additional gearing and/or clutches.

The field of mechanical power transmission is cognizant of continuous or infinitely variable variators of several types. For example, one well known class of continuous variators is the belt-and-variable-radius-pulley variator. Other known variators include hydrostatic, toroidal, and cone-and-ring variators. In some cases, these variators couple to other gearing to provide IVT functionality. Some hydromechanical variators can provide infinite ratio variability without additional gearing. Some variators, continuously and/or infinitely variable, are classified as frictional or traction variators because they rely on dry friction or elastohydrodynamic traction, respectively, to transfer torque across the variator. One example of a traction variator is a ball variator in which spherical elements are clamped between torque transfer elements and a thin layer of elastohydrodynamic fluid serves as the torque transfer conduit between the spherical and the torque transfer elements. It is to this latter class of variators that the inventive embodiments disclosed here are most related.

There is a continuing need in the CVT/IVT industry for transmission and variator improvements in increasing efficiency and packaging flexibility, simplifying operation, and reducing cost, size, and complexity, among other things. The inventive embodiments of the CVT and/or IVT methods, systems, subassemblies, components, etc., disclosed below address some or all of the aspects of this need.

SUMMARY OF THE INVENTION

The systems and methods herein described have several features, no single one of which is solely responsible for its desirable attributes. Without limiting the scope as expressed by the claims that follow, its more prominent features will now be discussed briefly. After considering this discussion, and particularly after reading the section entitled "Detailed Description of Certain Inventive Embodiments" one will understand how the features of the system and methods provide several advantages over traditional systems and methods.

One aspect of the invention relates to a shifting mechanism for an infinitely variable transmission (IVT) having a longitudinal axis and a set of traction planet assemblies arranged angularly about the longitudinal axis. In one embodiment, the shifting mechanism has a first carrier member coupled to each of the traction planet assemblies. The first carrier member is configured to guide the traction planet assemblies. The shifting mechanism has a second carrier member coupled to each of the traction planet assemblies. The second carrier member is configured to guide the traction planet assemblies. The first carrier member is capable of rotating with respect to the second carrier member. A carrier driver nut is coupled to the first carrier member. The carrier driver nut is adapted to translate axially. An axial translation of the carrier driver nut corresponds to a rotation of the first carrier member with respect to the second carrier member.

One aspect of the invention relates to an infinitely variable transmission (IVT) having a longitudinal axis. In one embodiment, the IVT has a number of traction planet assemblies arranged angularly about the longitudinal axis. The IVT is provided with a first carrier member coupled to each of the traction planet assemblies. The first carrier member is provided with a number of radially off-set slots. The first carrier member is configured to guide the traction planet assemblies. The IVT can include a second carrier member coupled to each of the traction planet assemblies. The second carrier member is provided with a number of radial slots. The first and second carrier members are configured to receive a rotational power input. In one embodiment, the first carrier member is capable of rotating with respect to the second carrier member. The IVT also includes a carrier driver nut coupled to the first carrier member. The carrier driver nut is adapted to translate axially. An axial translation of the carrier driver nut corresponds to a rotation of the first carrier member with respect to the second carrier member. In an alternative embodiment, the IVT has a main shaft positioned along the longitudinal axis. The main shaft is operably coupled to the first and second carrier members. The main shaft can have a set of helical splines that are configured to couple to a carrier driver nut. In yet another alternative embodiment, the carrier driver nut is adapted to translate axially along the main shaft. An axial translation of the carrier driver nut corresponds to a rotation of the carrier driver nut. In some embodiments, the IVT has a first traction ring coupled to each traction planet assembly. The first traction ring is substantially non-rotatable about the longitudinal axis. The IVT can be provided with a second traction ring coupled to each traction planet assembly. The second traction ring is adapted to provide a power output from the IVT. In an alternative embodiment, the first and second carrier members are adapted to receive the rotational power from the main shaft. In one embodiment, the IVT has a shift fork operably coupled to the carrier driver nut. The shift fork can have a pivot axis that is off-set from the longitudinal axis. A pivoting of the shift fork corresponds to an axial translation of the carrier driver nut. The axial translation of the carrier driver nut corresponds to a rotation of the carrier driver about the longitudinal axis. In an alternative embodiment, the IVT is provided with a pump operably coupled to the main shaft. In yet another embodiment, the IVT has a ground ring coupled to the first traction ring. The ground ring is coupled to a housing of the IVT.

Another aspect of the invention concerns an infinitely variable transmission (IVT) having a longitudinal axis. The IVT includes a main shaft arranged along the longitudinal axis. The main shaft is provided with a set of helical splines. The IVT has a group of traction planet assemblies arranged angularly about the longitudinal axis. In one embodiment, the IVT has a first carrier member coupled to each of the traction planet assemblies. The first carrier member is provided with a number of radially off-set slots. The first carrier member is configured to guide the traction planet assemblies. The IVT includes a second carrier member coupled to each of the traction planet assemblies. The second carrier member is provided with a number of radial slots. The first and second carrier members are coupled to a rotational power source. In one embodiment, the IVT includes a shifting mechanism having a shift fork. The shift fork has a pivot pin off-set from the longitudinal axis. The shifting mechanism includes a carrier driver nut operably coupled to the shift fork. The carrier driver nut has an inner bore configured to engage the helical splines of the main shaft. The carrier driver nut is configured to rotate about the longitudinal axis. In one embodiment, a movement of the shift fork about the pivot pin corresponds to an axial movement of the carrier driver nut. An axial movement of the carrier driver nut corresponds to a rotation of the first carrier member with respect to the second carrier member. In some embodiments, the IVT has a first traction ring in contact with each traction planet assembly. The first traction ring is substantially non-rotatable about the main shaft. The IVT can have a second traction ring in contact with each traction planet assembly. The second traction ring is adapted to provide a power output from the IVT. In some embodiments, an output shaft is operably coupled to the second traction ring. In an alternative embodiment, a disengagement mechanism is operably coupled to the output shaft. In yet another embodiment, a torque limiter is coupled to the second carrier member. The torque limiter can also be coupled to the main shaft. In some embodiments, the torque limiter includes a number of springs coupled to the second carrier member and the main shaft.

One aspect of the invention concerns a shifting mechanism for an infinitely variable transmission (IVT) having a main shaft arranged along a longitudinal axis of the IVT and a group of traction planet assemblies arranged angularly about the main shaft. The traction planet assemblies are coupled to first and second carrier members. The first carrier member is provided with a number of radially off-set guide slots. The first and second carrier members are adapted to receive a rotational power. In one embodiment, the shifting mechanism includes a shift fork. The shift fork has a pivot pin off-set from the longitudinal axis. The shifting mechanism has a carrier driver nut operably coupled to the shift fork. The carrier driver nut has an inner bore configured to engage a number of helical splines formed on the main shaft. The carrier driver nut is configured to rotate about the longitudinal axis. The carrier driver nut is adapted to axially translate along the longitudinal axis. A movement of the shift fork about the pivot pin corresponds to an axial movement of the carrier driver nut. An axial movement of the carrier driver nut corresponds to a rotation of the first carrier member with respect to the second carrier member. In an alternate embodiment, the shifting mechanism includes a shift collar operably coupled to the shift fork. A bearing can be coupled to the shift collar and be adapted to couple to the carrier driver nut. In yet another embodiment, the shifting mechanism has a rocker arm coupled to the shift fork.

Another aspect of the invention concerns an infinitely variable transmission (IVT) having a longitudinal axis. The IVT has a group of traction planets arranged angularly about the longitudinal axis. The IVT includes a first carrier member coupled to each of the traction planet assemblies. The first carrier member is provided with a number of radially off-set slots. The first carrier member is configured to guide the traction planet assemblies. The IVT has a second carrier member coupled to each of the traction planet assemblies. The second carrier member is provided with a group of radial slots. The first and second carrier members are coupled to a rotational power source. In one embodiment, the IVT has a carrier driver positioned radially outward of the first and second carrier members. The carrier driver has a number of longitudinal grooves. At least one groove is aligned parallel with the longitudinal axis, and said groove is coupled to the first carrier member. In one embodiment, at least one groove is angled with respect to the longitudinal axis, and said groove is coupled to the second carrier member. In other embodiments, the carrier driver is adapted to translate axially. In some embodiments, the axial translation of the carrier driver corresponds to a rotation of the first carrier member with respect to the second carrier member. In still other embodiments, the IVT has a pump coupled to the first carrier member.

Another aspect of the invention relates to an infinitely variable transmission (IVT) having a longitudinal axis. In one embodiment, the IVT has a number of traction planets arranged angularly about the longitudinal axis. The IVT is provided with a first carrier member coupled to each of the traction planet assemblies. The first carrier member is provided with a number of radially off-set slots. The radially off-set slots are configured to guide the traction planet assemblies. The first carrier member is provided with a number of longitudinal guide slots, and said longitudinal guide slots are formed at an angle with respect to the longitudinal axis. In one embodiment, the IVT has a second carrier member coupled to each of the traction planet assemblies. The second carrier member is provided with a number of radial slots. The radial slots are configured to guide the traction planet assemblies. The second carrier member is provided with a number of longitudinal guide slots, and said longitudinal guide slots are arranged parallel to the longitudinal axis. In one embodiment, the first and second carrier members are configured to couple to a rotational power source. The IVT also has a carrier driver coupled to the first and second carrier members. The carrier driver is adapted to rotate about the longitudinal axis. The carrier driver is adapted to translate axially. In one embodiment, an axial translation of the carrier driver corresponds to a rotation of the first carrier member with respect to the second carrier member. In some embodiments, the carrier driver has a set of shift pins extending radially outward from a central cylindrical hub. The cylindrical hub is coaxial with the longitudinal axis. In other embodiments, the IVT has a spring coupled to the carrier driver. In yet other embodiments, an axial translation of the carrier driver corresponds to a change in the transmission ratio of the IVT.

Another aspect of the invention concerns a shifting mechanism for an infinitely variable transmission (IVT) having a group of traction planet assemblies. In one embodiment, the shifting mechanism has a first carrier member having a number of radially off-set guide slots. The radially off-set guide slots are arranged to guide the traction planet assemblies. The first carrier member has a number of longitudinal slots, and said longitudinal slots angled with respect to the longitudinal axis. The shifting mechanism includes a second carrier member has a number of guide slots arranged about the longitudinal axis. The guide slots are arranged to guide the traction planet assemblies. The second carrier member has a number of longitudinal slots, and said longitudinal slots parallel to the longitudinal axis. The shifting mechanism has a carrier driver coupled to the first and second carrier members. The carrier driver has a number of shift pins extending from a central hub. The shift pins engage the longitudinal slots formed on the first and second carrier members. An axial translation of the carrier driver corresponds to a rotation of the first carrier member with respect to the second carrier member. In some embodiments, the carrier driver, the first carrier member, and the second carrier member are configured to rotate about the longitudinal axis at a speed substantially equal to an input speed of a power source coupled to the IVT. In other embodiments, the shifting mechanism has a shift roller coupled to each shift pin. The shift roller is in contact with the longitudinal slots of the first carrier member.

Another aspect of the invention relates to a method of controlling an infinitely variable transmission (IVT) having a longitudinal axis. The method includes the step of providing a group of traction planet assemblies arranged angularly about the longitudinal axis. The method can include providing a first carrier member coupled to each traction planet assembly. The first carrier member has a number of radially off-set guide slots arranged to guide the traction planet assemblies. In one embodiment, the method includes the step of providing a second carrier member coupled to each traction planet assembly. The second carrier member has a number of radial guide slots arranged to guide the traction planet assemblies. The method can include the step of coupling the first and second carrier members to a rotational power source. The method includes providing a carrier driver nut coupled to the first carrier member. The method also includes the step of translating the carrier driver nut along the longitudinal axis. In an alternative embodiment, the step of translating the carrier driver nut includes the step of rotating the first carrier member with respect to the second carrier member. In some embodiments, the method includes the step of operably coupled the carrier driver nut to a shift fork. In some embodiments, the method includes the step of coupling a toque limiter to the second carrier member. In yet other embodiments, the method includes coupling the torque limiter to the rotational source of power. In some embodiments, the method includes the step of sensing a torque applied to the second carrier member. The method can also include the step of rotating the second carrier member based at least in part on the sensed torque. Rotating the second carrier member can include the step of adjusting the transmission ratio.

BRIEF DESCRIPTION OF THE FIGURES

FIG. 3 is a perspective view of internal components of the IVT of FIG. 1.

FIG. 4 is a plan view of internal components of the IVT of FIG. 1.

FIG. 9 is a cross-sectional view of an embodiment of a carrier driver ring that can be used with the IVT of FIG. 7.

FIG. 10 is a perspective view of the carrier driver ring of FIG. 9.

FIG. 11 is a cross-sectional plan view of the carrier driver ring of FIG. 9.

FIG. 12 is a cross-sectional plan view of one embodiment of a carrier driver ring that can be used in the IVT of FIG. 7.

FIG. 13 is a cross-sectional plan view of another embodiment of a carrier driver ring that can be used in the IVT of FIG. 7.

FIG. 29 is a cross-sectional view of an embodiment of a disengagement mechanism that can be used with the IVT of FIG. 1 or 20.

FIG. 30 is another cross-sectional view of the disengagement mechanism of FIG. 29.

FIG. 31 is a perspective view of a disengagement mechanism that can be used with the IVT of FIG. 20.

FIG. 32 is a cross-sectional view of the disengagement mechanism of FIG. 31.

FIG. 33 is another perspective view of the disengagement mechanism of FIG. 31.

FIG. 34 is yet another cross-sectional view of the disengagement mechanism of FIG. 31.

DETAILED DESCRIPTION OF CERTAIN INVENTIVE EMBODIMENTS

Figure 1:
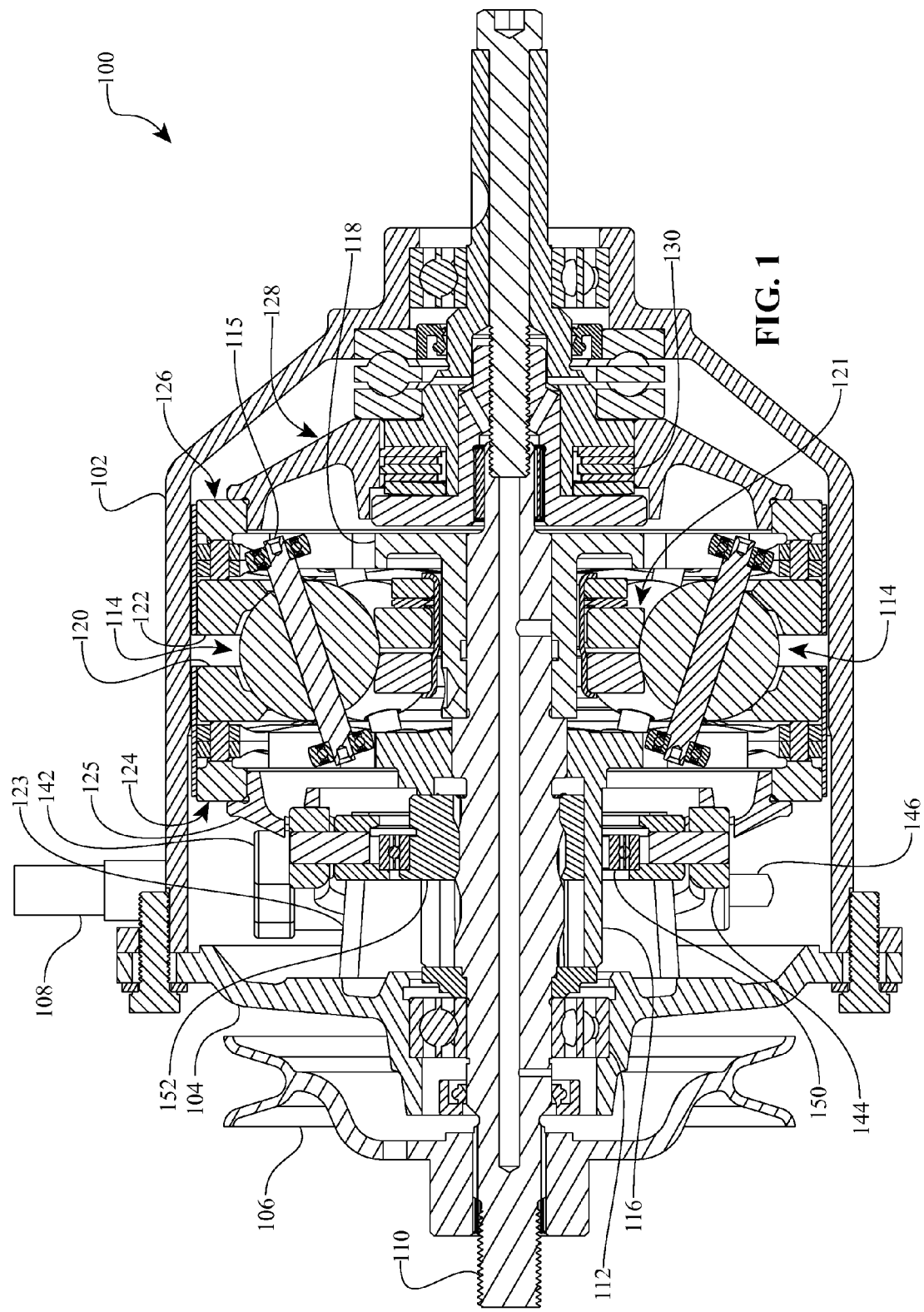
FIG. 1 is a cross-sectional view of a ball planetary infinitely variable transmission (IVT) having a skew-based control system.

The preferred embodiments will be described now with reference to the accompanying figures, wherein like numerals refer to like elements throughout. The terminology used in the descriptions below is not to be interpreted in any limited or restrictive manner simply because it is used in conjunction with detailed descriptions of certain specific embodiments of the invention. Furthermore, embodiments of the invention can include several inventive features, no single one of which is solely responsible for its desirable attributes or which is essential to practicing the inventions described. Certain continuously variable transmission (CVT) and infinitely variable transmission (IVT) embodiments described here are generally related to the type disclosed in U.S. Pat. Nos. 6,241,636; 6,419,608; 6,689,012; 7,011,600; 7,166,052; U.S. patent application Ser. Nos. 11/243,484 and 11/543,311; and Patent Cooperation Treaty patent applications PCT/IB2006/054911, PCT/US2008/068929, PCT/US2007/023315, PCT/US2008/074496, and PCT/US2008/079879. The entire disclosure of each of these patents and patent applications is hereby incorporated herein by reference.

As used here, the terms "operationally connected," "operationally coupled", "operationally linked", "operably connected", "operably coupled", "operably linked," and like terms, refer to a relationship (mechanical, linkage, coupling, etc.) between elements whereby operation of one element results in a corresponding, following, or simultaneous operation or actuation of a second element. It is noted that in using said terms to describe inventive embodiments, specific structures or mechanisms that link or couple the elements are typically described. However, unless otherwise specifically stated, when one of said terms is used, the term indicates that the actual linkage or coupling may take a variety of forms, which in certain instances will be readily apparent to a person of ordinary skill in the relevant technology.

For description purposes, the term "radial" is used here to indicate a direction or position that is perpendicular relative to a longitudinal axis of a transmission or variator. The term "axial" as used here refers to a direction or position along an axis that is parallel to a main or longitudinal axis of a transmission or variator. For clarity and conciseness, at times similar components labeled similarly.

It should be noted that reference herein to "traction" does not exclude applications where the dominant or exclusive mode of power transfer is through "friction." Without attempting to establish a categorical difference between traction and friction drives here, generally these may be understood as different regimes of power transfer. Traction drives usually involve the transfer of power between two elements by shear forces in a thin fluid layer trapped between the elements. The fluids used in these applications usually exhibit traction coefficients greater than conventional mineral oils. The traction coefficient ($\mu$) represents the maximum available traction forces which would be available at the interfaces of the contacting components and is a measure of the maximum available drive torque. Typically, friction drives generally relate to transferring power between two elements by frictional forces between the elements. For the purposes of this disclosure, it should be understood that the IVTs described here may operate in both tractive and frictional applications. For example, in the embodiment where an IVT is used for a bicycle application, the IVT can operate at times as a friction drive and at other times as a traction drive, depending on the torque and speed conditions present during operation.

Embodiments of the invention disclosed here are related to the control of a variator and/or an IVT using generally spherical planets each having a tiltable axis of rotation (sometimes referred to here as a "planet axis of rotation") that can be adjusted to achieve a desired ratio of input speed to output speed during operation. In some embodiments, adjustment of said axis of rotation involves angular misalignment of the planet axis in a first plane in order to achieve an angular adjustment of the planet axis of rotation in a second plane, thereby adjusting the speed ratio of the variator. The angular misalignment in the first plane is referred to here as "skew" or "skew angle". This type of variator control is generally described in U.S. patent application Ser. Nos. 12/198,402 and 12/251,325, the entire disclosure of each of these patent applications is hereby incorporated herein by reference. In one embodiment, a control system coordinates the use of a skew angle to generate forces between certain contacting components in the variator that will tilt the planet axis of rotation in the second plane. The tilting of the planet axis of rotation adjusts the speed ratio of the variator. Embodiments of skew control systems (sometimes referred to here as "skew based control systems") and skew angle actuation devices for attaining a desired speed ratio of a variator will be discussed.

Embodiments of an infinitely variable transmission (IVT), and components and subassemblies thereof, will be described now with reference to FIGS. 1-38. Embodiments of shifting mechanisms for controlling the relative angular position between two disc-like transmission members will be described as well. These shifting mechanisms can improve control for many different types of infinitely variable transmissions, and are shown in certain embodiments here for illustrative purposes. FIG. 1 shows an IVT 100 that can be used in many applications including, but not limited to, human powered vehicles (for example, bicycles), light electrical vehicles, hybrid human-, electric-, or internal combustion powered vehicles, industrial equipment, wind turbines, etc. Any technical application that requires modulation of mechanical power transfer between a power input and a power sink (for example, a load) can implement embodiments of the IVT 100 in its power train.

Figure 2:
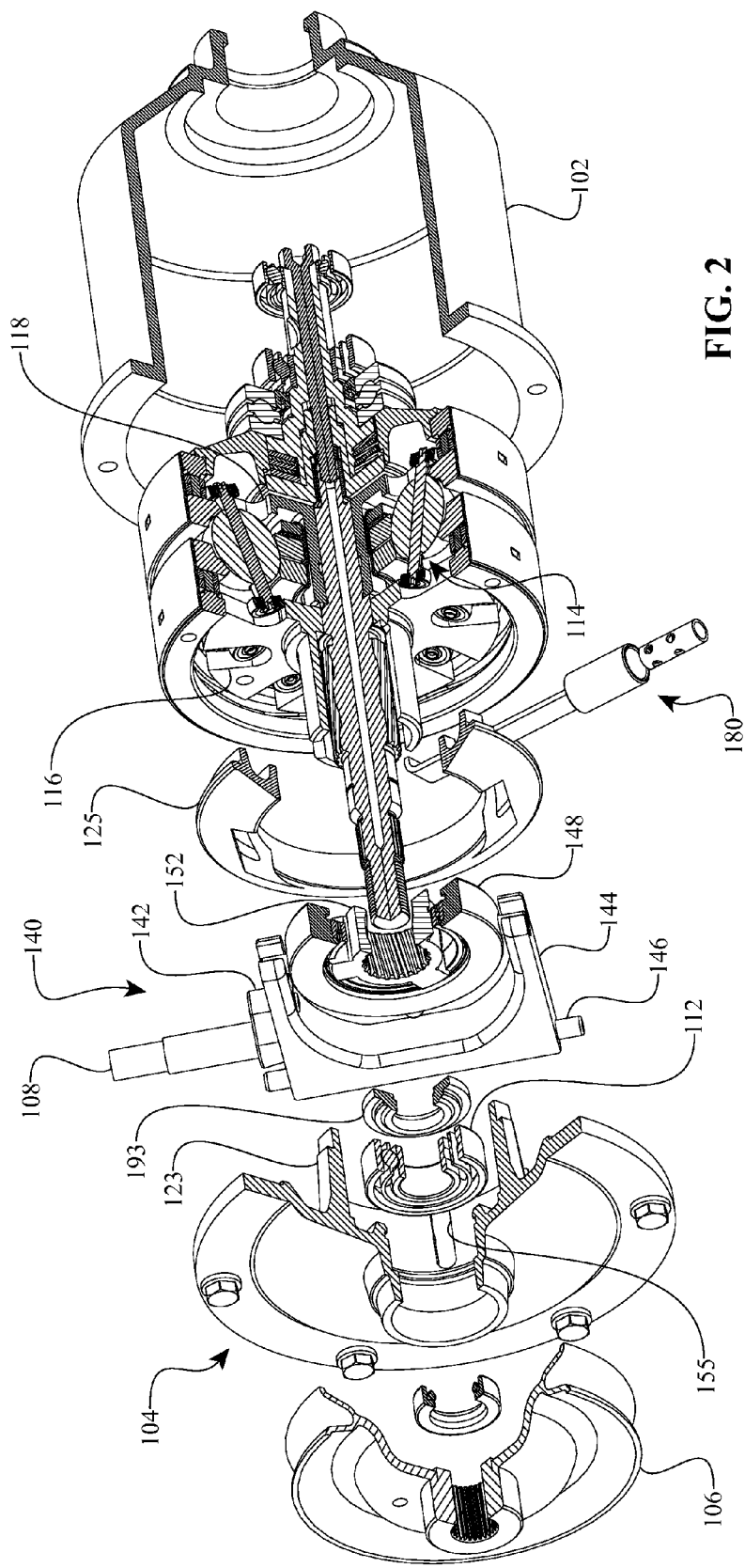
FIG. 2 is a partially cross-sectioned exploded view of the IVT of FIG. 1.

Referring now to FIGS. 1 and 2, in one embodiment the IVT 100 includes a housing 102 coupled to a housing cap 104. The housing 102 and the housing cap 104 support a power input interface such as a pulley 106 and a control interface such as an actuator coupling 108. The pulley 106 can be coupled to a drive belt driven by a source of rotational power such as an internal combustion engine (not shown). In one embodiment, the IVT 100 is provided with a main shaft 110 that substantially defines a longitudinal axis of the IVT 100. The main shaft 110 couples to the pulley 106. The main shaft 110 is supported by a bearing 112 in the housing cap 104. The IVT 100 includes a plurality of traction planet assemblies 114 arranged angularly about the main shaft 110. Each traction planet assembly 114 is coupled to first and second carrier members 116, 118, respectively. The main shaft 110 couples to the first carrier member 116. The first and second carrier members 116, 118 are coaxial with the main shaft 110. In one embodiment, each traction planet assembly 114 is coupled to first and second traction rings 120, 122, respectively. Each traction planet assembly 114 is in contact with an idler assembly 121 at a radially inward location. The first traction ring 120 couples to a first axial force generator assembly 124. The first traction ring 120 and the first axial force generator assembly 124 is substantially non-rotatable with respect to the housing 102. In one embodiment, the first axial force generator assembly 124 is coupled to a ground ring 125. The ground ring 125 attaches to a shoulder 123 extending from the housing cap 104. The second traction ring 122 is coupled to a second axial force generator 126. The second traction ring 122 and the second axial force generator 126 is coupled to an output power interface 128. The output power interface 128 can be coupled to a load (not shown). In one embodiment, the output power interface 128 includes a disengagement mechanism 130 configured to mechanically decouple the second traction ring 122 from the load.

Referring now to FIGS. 1-4, in one embodiment the IVT 100 can be used with a shift control mechanism 140. The shift control mechanism 140 can be used other types of transmissions, and is shown here with the IVT 100 as an example. The shift control mechanism 140 can include the actuator coupling 108 coupled to a rocker arm 142. The rocker arm 142 couples to a shift fork 144 that is configured to rotate about a pivot pin 146. In one embodiment, the pivot pin 146 is offset from the longitudinal axis. The shift fork 144 couples to a shift collar 148. The shift collar 148 supports a bearing 150. The bearing 150 couples to a carrier driver nut 152. The carrier driver nut 152 is coupled to the main shaft 110 and the first carrier member 116.

Figure 5:
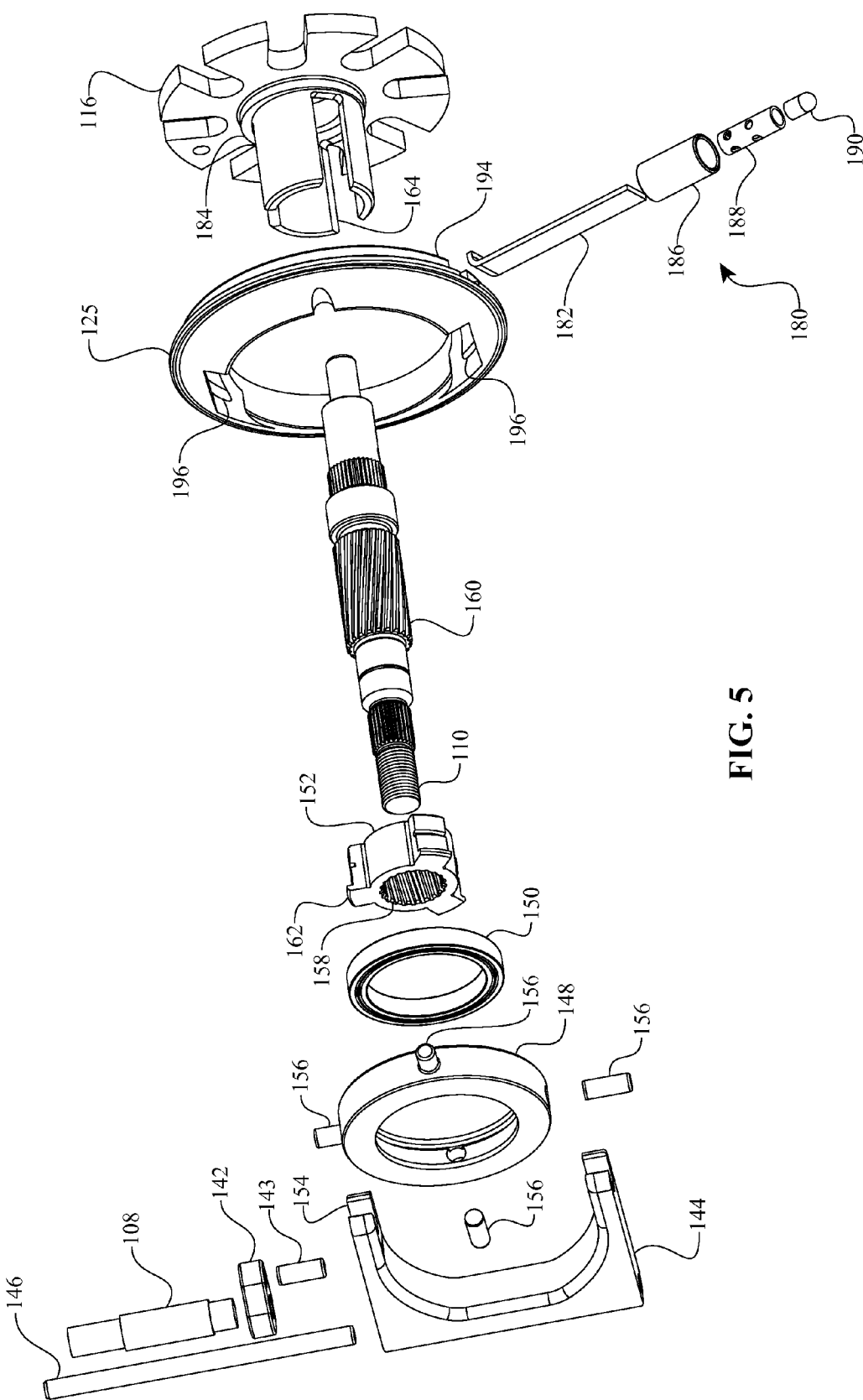
FIG. 5 is an exploded view of shifting components that can be used with the IVT of FIG. 1.

Referring now to FIG. 5 and still referring to FIGS. 1-4, in one embodiment the rocker arm 142 rotatably couples to a pivot 143. The pivot 143 can be a dowel attached to the shift fork 144. The shift fork 144 can have a set of slots 154. The slots 154 guide a set of engagement dowels 156 attached to the shift collar 148. In one embodiment, the shift collar 148 is provided with four engagement dowels 156. In some embodiments, two engagement dowels 156 are positioned to ride in the slots 154 while two engagement dowels 156 are positioned to ride in a set of slots 155 (FIG. 2) formed in the shoulder 123 of the housing cap 104. In one embodiment, the carrier driver nut 152 has an inner bore 158 formed with helical splines. The inner bore 158 couples to mating helical splines 160 formed on the main shaft 110. The carrier driver nut 152 is provided with a number of guide surfaces 162 extending radially outward from the inner bore 158. The guide surfaces 162 couple to mating guide surfaces 164 formed on the first carrier member 116.

Figure 6:
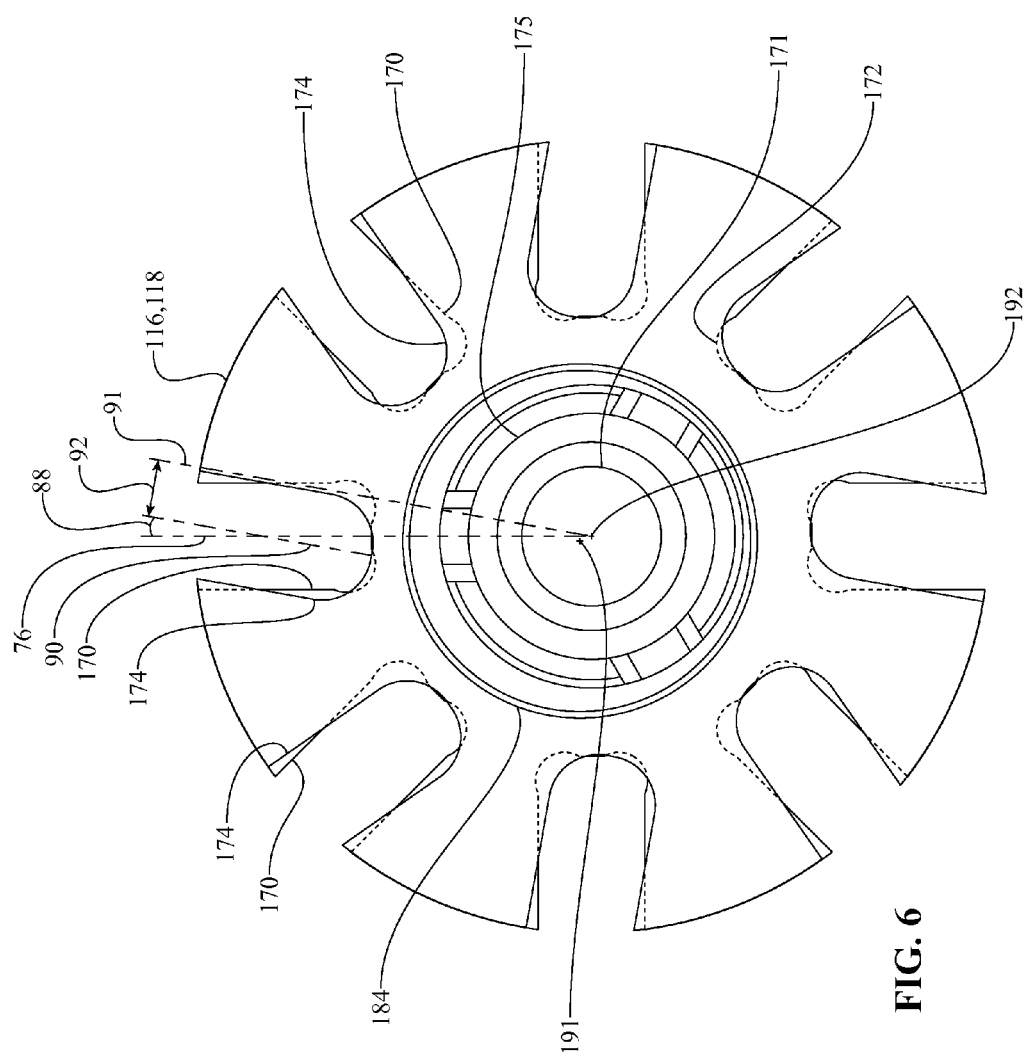
FIG. 6 is a plan view of an embodiment of first and second carrier members that can be used in the IVT of FIG. 1.
Figure 7:
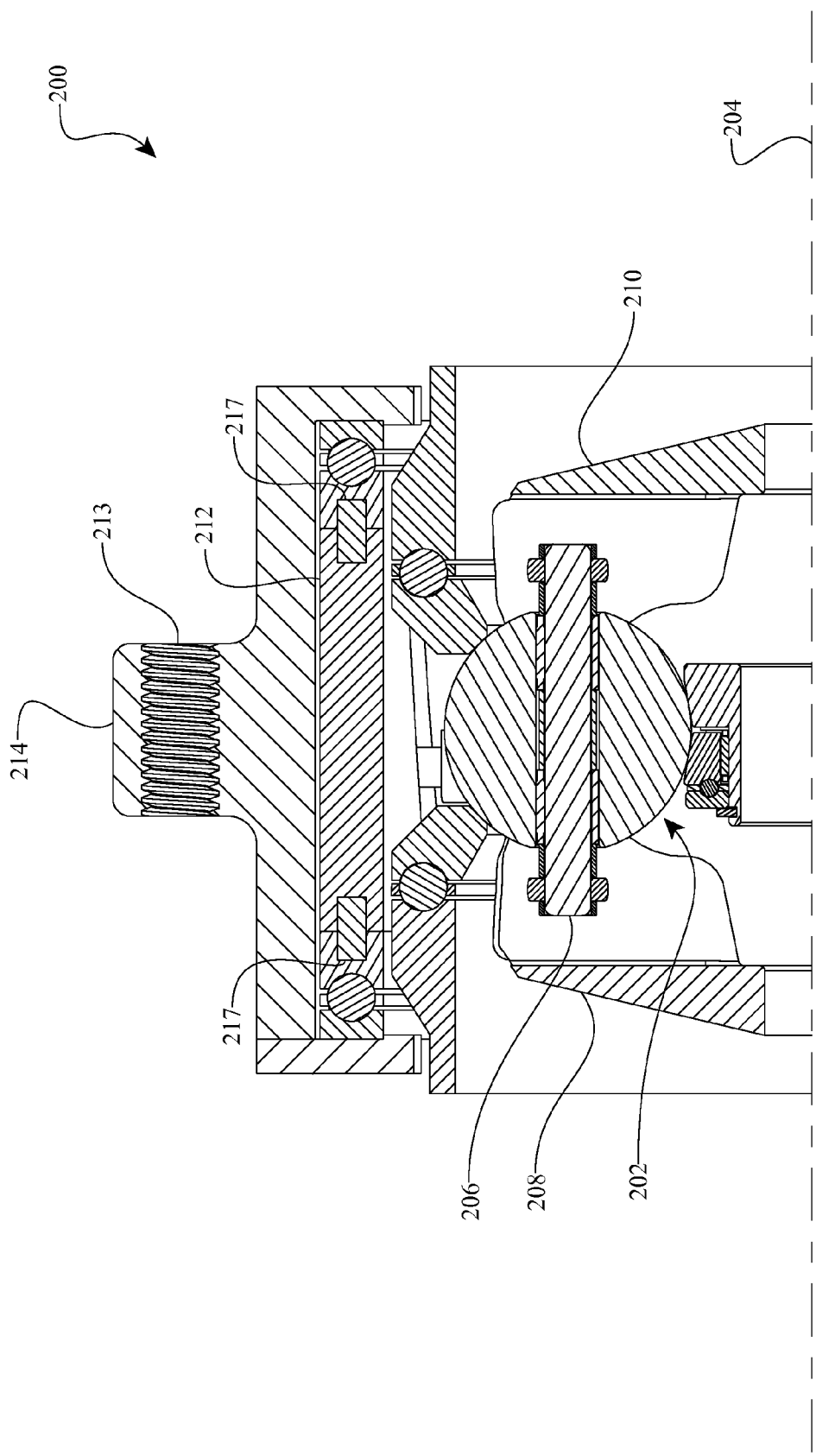
FIG. 7 is a cross-sectional view of an infinitely variable transmission (IVT) having a skew-based control system.
Figure 8:
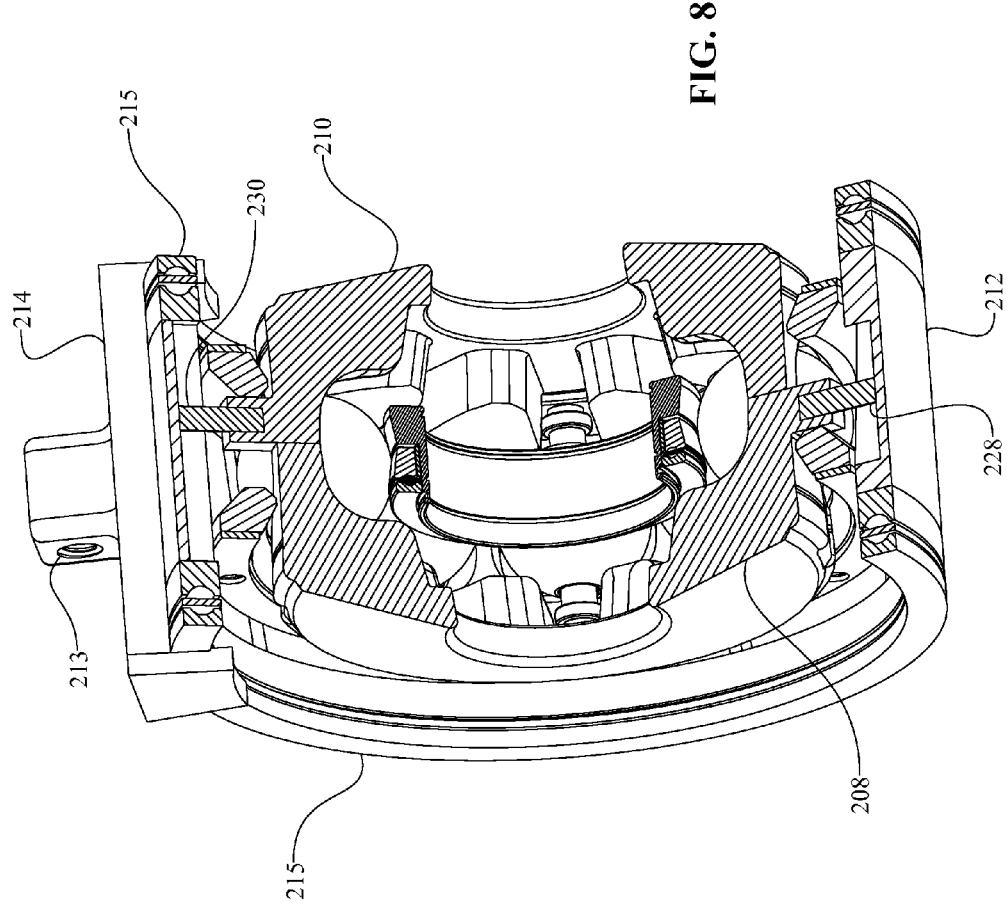
FIG. 8 is a cross-sectional perspective view of the IVT of FIG. 7.

Turning now to FIG. 6, in one embodiment the second carrier member 118 can be provided with a number of guide slots 170 arranged angularly about a central bore 171. The guide slots 170 are aligned with a radial construction line 76 when viewed in the plane of the page of FIG. 6. The guide slots 170 are adapted to receive one end of a planet axle 115 (FIG. 1). In some embodiments, a radially inward portion 172 of the guide slots 170 are formed with curved profiles sized to accommodate the traction planet axle 115. In one embodiment, the first carrier member 116 is provided with a number of radially off-set guide slots 174 arranged angularly about a central bore 175. Each radially off-set guide slot 174 is sized to accommodate the coupling of the first carrier member 116 to the planet axle 115. The radially off-set guide slots 174 are angularly offset from the radial construction line 76 when viewed in the plane of the page of FIG. 6. The angular offset can be approximated by an angle 88. The angle 88 is formed between the radial construction line 76 and a construction line 90. The construction line 90 substantially bisects the radially off-set guide slot 174 when viewed in the plane of the page of FIG. 6. In some embodiments, the angle 88 is between 3 degrees and 45 degrees. A low angle 88 produces a highly responsive transmission ratio change but potentially more difficult to control or stabilize, while a high angle can be less responsive in transmission ratio change but easy to control by comparison. In some embodiments, where it is desirable to have high speed, fast shift rates, the angle 88 can be, for example, 10 degrees. In other embodiments, where it is desirable to have slower speed, precise control of transmission ratio, the angle 88 can be about 30 degrees. However, the said values of the angle 88 are provided as an illustrative example, and the angle 88 can be varied in any manner a designer desires. In some embodiments, the angle 88 can be any angle in the range of 10 to 25 degrees including any angle in between or fractions thereof. For example, the angle 88 can be 10, 11, 12, 13, 14, 15, 16, 17, 18, 19, 20, 21, 22, 23, 24, 25, or any portion thereof. In other embodiments, the angle 88 can be 20 degrees. In one embodiment, the radially off-set guide slots 174 can be arranged so that the construction line 90 is radially offset from a construction line 91 by a distance 92. The construction line 91 is parallel to the construction line 90 and intersects the center of the first carrier member 116.

During operation of the IVT 100, a change in transmission ratio is achieved by rotating the actuator coupling 108. In some embodiments, the actuator coupling 108 is attached to a user control (not shown) that can be a mechanical linkage actuated with a user's hand. In other embodiments, the actuator coupling 108 can be coupled to an electrical or hydraulic actuator that can impart a rotary motion to the actuator coupling 108 that is indicative of the desired transmission ratio for IVT 100. Since the actuator coupling 108 is axially fixed with respect to the longitudinal axis, a rotation of the actuator coupling 108 tends to rotate the rocker arm 142 to thereby rotate and axially translate the pivot 143. Movement of the pivot 143 tends to rotate the shift fork 144 about the pivot pin 146. The pivot pin 146 is off-set from the main shaft 110 so that a rotation of the shift fork 144 about the pivot pin 146 corresponds to an axial translation of the slots 154. The axial movement of the slots 154 tends to axially move the shift collar 148 with respect to the main shaft 110. Since the carrier driver nut 152 is operably coupled to the shift collar 148, an axial translation of the shift collar 148 corresponds to an axial translation of the carrier driver nut 152. The carrier driver nut 152 couples to the helical splines 160 of the main shaft 110. An axial translation of the carrier driver nut 152 facilitates a relative rotation of the carrier driver nut 152 with respect to the main shaft 110. Since the carrier driver nut 152 engages the guide surfaces 164 of the first carrier member 116, a rotation of the carrier driver nut 152 with respect to the main shaft 110 corresponds to a rotation of the first carrier member 116 with respect to the main shaft 110. A rotation of the first carrier member 116 with respect to the second carrier member 118 tends to change the transmission ratio of the IVT 100.

It should be noted that a designer can configure the position of the rocker 142, the pivot 143, and the pivot pin 146 relative to the slots 154 to achieve a desired relationship between a rotation applied to the actuator coupling 108 and the axial displacement of the carrier driver nut 152. In some embodiments, a designer may select the position of the rocker 142, the pivot 143, and the pivot pin 146 to provide a desired force or torque applied to the actuator coupling 108 to achieve a change in transmission ratio. Likewise, a designer can select the pitch and lead of the helical splines 160 to achieve a desired relationship between an axial displacement of the carrier driver nut 152 and a rotation of the first carrier member 116.

Referring again to FIGS. 5 and 6, in one embodiment the IVT 100 can be provided with a pump assembly 180. The pump assembly 180 includes a pump driver 182 that couples to a lobe 184 formed on the first carrier member 116. The pump assembly 180 includes a pump plunger 186 attached to the pump driver 182. The pump plunger 186 surrounds a valve body 188 and a valve plunger 190. In one embodiment, the lobe 184 has a center 191 (FIG. 6) that is off-set from a center 192 of the first carrier member 116. In some embodiments, the lobe 184 can be formed on main shaft 110 or on a retaining nut 193, and likewise, the pump assembly 180 is appropriately located axially so that the pump driver 182 can engage the lobe 184. During operation of the IVT 100, the main shaft 110 rotates about the longitudinal axis and thereby drives the first carrier member 116. The lobe 184 drives the pump driver 182 in a reciprocating motion as the first carrier member 116 rotates about the longitudinal axis. In one embodiment, the ground ring 125 is provided with a guide groove 194 that is adapted to receive the pump driver 182. The ground ring 125 can also be provided with a number of clearance reliefs 196 that are appropriately sized to provide clearance to the engagement dowels 156 and the shift fork 144.

Passing now to FIGS. 7-10, an IVT 200 can include a number of traction planet assemblies 202 arranged angularly about a longitudinal axis 204. For clarity, the housing and some internal components of the IVT 200 are not shown. Each traction planet assembly 202 is provided with a ball axle 206. The ball axles 206 are operably coupled to first and second carrier members 208, 210, respectively. The first and second carrier members 208, 210 can be substantially similar to the first and second carrier members 116, 118, respectively. In one embodiment, the first and second carrier members 208, 210 couple to a rotational power source (not shown). The IVT 200 is provided with a carrier driver ring 212 located radially outward of each of the traction planet assemblies 202. The carrier driver ring 212 is couple to a shift clevis 214 by a set of bearings 215. The bearing 215 can be rotationally constrained to the carrier drive ring 212 with a plurality of dowels 217, for example. In one embodiment, the shift clevis 214 is provided with a threaded bore 213. The threaded bore 213 is generally parallel to the longitudinal axis 204. The threaded bore 213 can couple to a threaded shift rod (not shown) to facilitate the axial translation of the shift clevis 214.

Referring specifically to FIGS. 9 and 10, the carrier driver ring 212 has a set of longitudinal grooves 220 formed on an inner circumference of the carrier driver ring 212. The longitudinal grooves 220 are substantially parallel to the longitudinal axis 204. The carrier driver ring 212 has a set of off-set longitudinal grooves 222 formed on the inner circumference. The off-set longitudinal grooves 222 are angled with respect to the longitudinal axis 204. The off-set longitudinal grooves 222 form an angle 224 with respect to the longitudinal axis 204 when viewed in the plane of FIG. 9. In some embodiments, the angle 224 can be any angle in the range of 0 to 30 degrees including any angle in between or fractions thereof. For example, the angle 224 can be 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30 or any portion thereof. In one embodiment, the first carrier member 208 is provided with a number of dowels 228. The dowels 228 couple to, and are guided by, the longitudinal grooves 220. The second carrier member 210 is provided with a number of dowels 230. The dowels 230 couple to, and are guided by, the off-set longitudinal grooves 222.

During operation of the IVT 200, a change in transmission ratio can be achieved by axially translating the shift clevis 214. An axial translation of the shift clevis 214 tends to axially translate the carrier driver ring 212. An axial translation of the carrier driver ring 212 tends to guide the dowels 228, 230 in the grooves 220, 222, respectively. Since the first and second carrier members 208, 210 are substantially fixed in the axial direction, the first and second carrier members 208, 210 rotate relative to each other as the dowels 228, 230 travel axially in the grooves 220, 222, respectively.

Referring specifically now to FIGS. 11-13, the longitudinal grooves formed on the carrier driver ring 212 can take many forms in order to provide the desired relative rotation of the first carrier member 208 with respect to the second carrier member 210. For example, FIG. 11 shows the longitudinal groove 220 and the off-set longitudinal groove 222. On one side of the carrier driver ring 212 the grooves 220, 222 are separated by a distance 232. On the opposite side of the carrier driver ring 212, the grooves 220, 222 are separated by a distance 234. In the embodiment illustrated in FIG. 12, the carrier driver ring 212 is provided with the longitudinal grooves 220 and a set of curved groove 236. In the embodiment illustrated in FIG. 13, the carrier driver ring 212 is provided with a set of positively off-set longitudinal grooves 238 and a set of negatively off-set longitudinal grooves 240. It should be noted that the embodiments described here are for illustrative purposes and the shape and dimensions of the grooves formed on the carrier ring 212 can be configured by a designer to achieve a desired shift performance. For example, the 232 distance between the longitudinal grooves 220 and the off-set longitudinal grooves 222 can be less than the distance 234 on an opposite side of the carrier driver ring 212. The difference between the distances 232, 234 can be configured to produce a desired rotation of the first carrier member 208 with respect to the second carrier member 210 over an axial displacement of the carrier driver ring 212 along the longitudinal axis 204.

Figure 14:
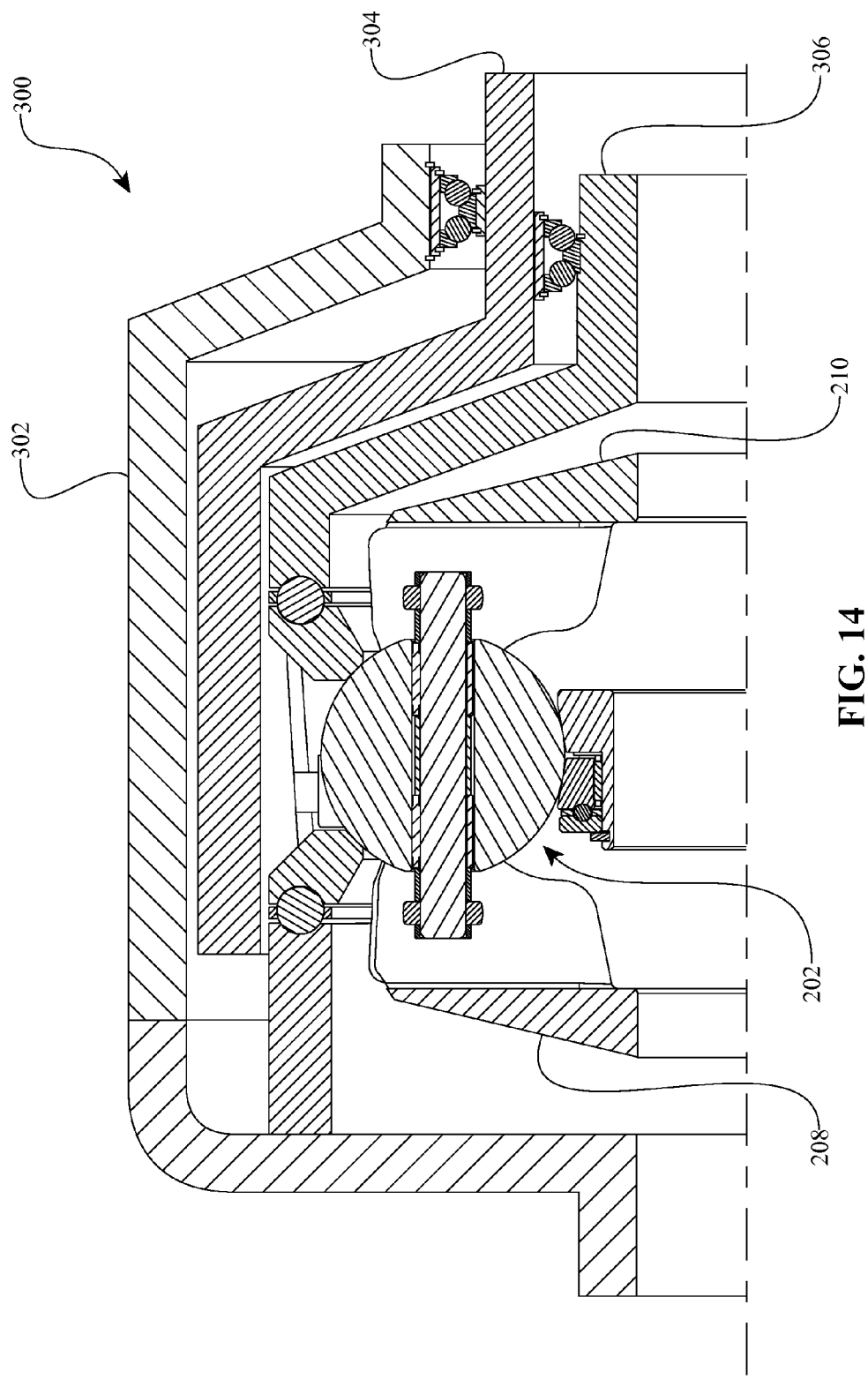
FIG. 14 is a cross-sectional view of an IVT having a skew-based control system and a carrier driver ring.

Passing now to FIG. 14, in one embodiment an IVT 300 can be substantially similar to the IVT 200. The IVT 300 can include a housing 302 configured to substantially enclose internal components of the IVT 300. The IVT 300 can be provided with a carrier driver ring 304. The carrier driver ring 304 can be coupled to the first and second carrier members 208, 210 in a similar manner as the carrier driver ring 212. The carrier driver ring 304 can be configured to translate axially by an actuator such as a motor (not shown). In one embodiment, the carrier driver ring 304 is radially supported on an output ring 306. The output ring 306 is operably coupled to each of the traction planet assemblies 202.

Figure 15:
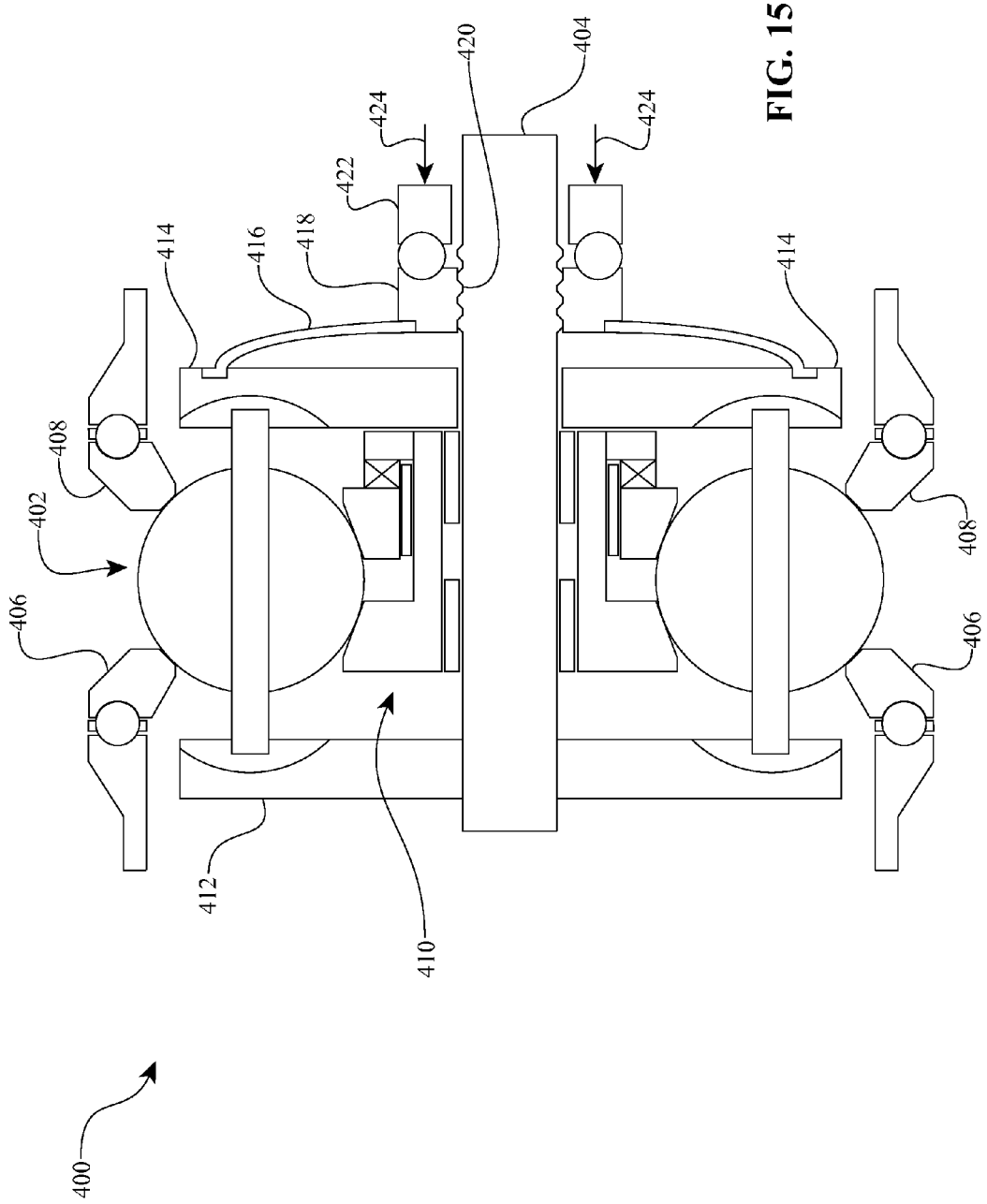
FIG. 15 is a schematic view of an embodiment of an IVT having a skew-based control system and a linearly actuated carrier driver.
Figure 16:
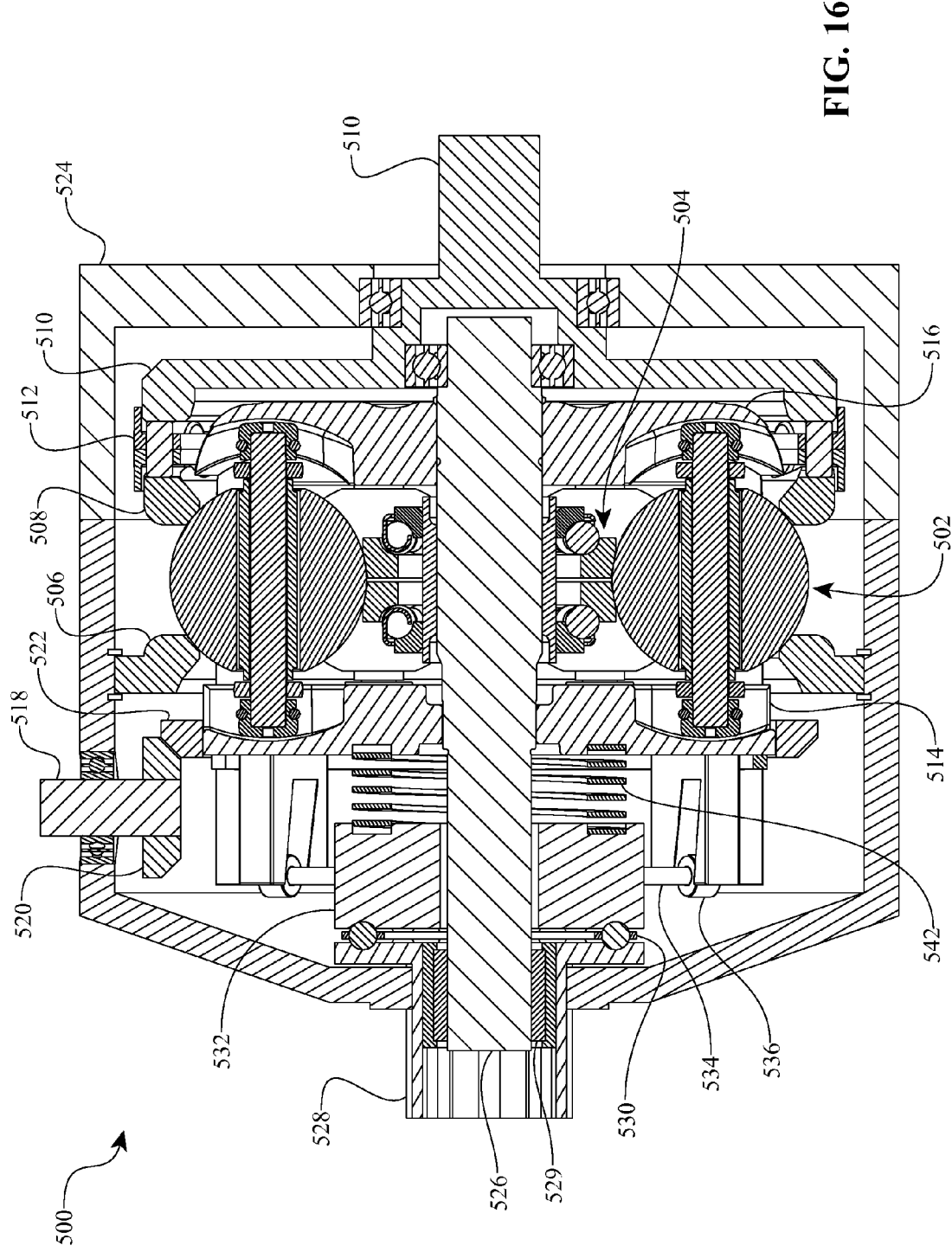
FIG. 16 is a cross-sectional view of one embodiment of an IVT having a skew-based control system and a linearly actuated carrier driver.

Turning now to FIG. 15, in one embodiment an IVT 400 can have a number of traction planet assemblies 402 arranged angularly about a main shaft 404. Each traction planet assembly 402 couples to first and second traction rings 406, 408, respectively. Each traction planet assembly 402 couples to an idler assembly 410. The idler assembly 410 is located radially inward of each traction planet assembly 402. In one embodiment, each traction planet assembly 402 is coupled to first and second carrier members 412, 414. The first and second carrier members 412, 414 can be substantially similar to the first and second carrier members 116, 118, respectively. In one embodiment, the first carrier member 412 is rigidly attached to the main shaft 404. The first and second carrier members 412, 414 and the main shaft 404 can be adapted to operably couple to a source for rotational power (not shown). The second carrier member 414 is adapted to rotate with respect to the first carrier member 412. In one embodiment, the second carrier 414 is coupled to a torsion plate 416. The torsion plate 416 is coaxial with the second carrier 414 and can be rigidly attached to the second carrier plate 414 with splines, weld, or other appropriate fastening means. In one embodiment, the torsion plate 416 is rigid or stiff in a rotational direction but has a degree of flexibility in the axial direction, as is common among torsion plates. This degree of flexibility in the axial direction provides a spring-like compliance to the torsion plate 416. The torsion plate 416 is coupled to a carrier driver nut 418 at a radially inward location. The carrier driver nut 418 has an inner bore formed with helical splines 420 that are arranged to engage mating helical splines formed on the main shaft 404. The carrier driver nut 418 is operably coupled to an actuator coupling 422. In one embodiment, the actuator coupling 422 is coupled to a linear actuator such as a servo motor or manual lever (not shown) that produces a force depicted as a vector 424 in FIG. 15. In one embodiment, the actuator coupling 422 is substantially non-rotatable about the main shaft 404.

During operation of the IVT 400, a change in transmission ratio is achieved by axially translating actuator coupling 422. An axial translation of the actuator coupling 422 tends to axially translate the carrier driver nut 418. Since the carrier driver nut 418 engages the main shaft 404 on helical splines 420, an axial translation of the carrier driver nut 418 with respect to the main shaft 404 tends to facilitate a relative rotation between the carrier driver nut 418 and the main shaft 404. The torsion plate 416 rotates as the carrier driver nut 418 rotates, which tends to rotate the second carrier member 414 with respect to the first carrier member 412.

Referring now to FIGS. 16-19, in one embodiment an IVT 500 can be provided with a number of traction planet assemblies 502 in contact with, and radially outward of an idler assembly 504. Each traction planet assembly 502 is in contact with first and second traction rings 506, 508, respectively. In one embodiment, the first traction ring 506 is substantially non-rotatable. The IVT 500 can be provided with an output shaft 510. The output shaft 510 couples to a common axial force generator coupling 512, which is configured to engage the second traction ring 508. Each traction planet assembly 502 is guided and supported by first and second carrier members 514, 516, respectively. The first and second carrier members 514, 516 are provided with guide slots 513, 515, respectively. In one embodiment, the guide slots 513, 515 are substantially similar to guide slots 170, 174, respectively. The first and second carrier members 514, 516 are adapted to receive a power input from a rotational power source (not shown). In one embodiment, an input shaft 518 can be coupled to a drive gear 520 that engages a carrier gear 522. The carrier gear 522 facilitates the transfer of power to the first and second carrier members 514, 516. The output shaft 510 can be supported by a bearing, for example, on the housing 524. In one embodiment, the housing 524 is formed with two parts that are fastened together to substantially enclose the internal components of the IVT 500.

In one embodiment, the IVT 500 is provided with a center shaft 526 that substantially defines a longitudinal axis of the IVT 500. The center shaft 526 can be configured to support the first and second carrier members 514, 516. In some embodiments, the second carrier member 516 is rigidly attached to the center shaft 526. The first carrier member 514 can be piloted onto the center shaft 526 so that the first carrier member 514 can rotate with respect to the second carrier member 516. One end of the center shaft 526 can be configured to support an actuator coupling 528. In one embodiment, a bearing 529 supports the actuator coupling 528 on the center shaft 514. The bearing 529 is configured to allow axial translation of the actuator coupling 528 with respect to the center shaft 526. The actuator coupling 528 is attached to the housing 524 with splines and is substantially non-rotatable with respect to the center shaft 526. In one embodiment, the actuator coupling 528 is coupled to a linear actuator (not shown) to facilitate an axial translation of the actuator coupling 528. The actuator coupling 528 couples with a bearing 530 to a carrier driver hub 532. The carrier driver hub 532 couples to the first and second carrier members 514, 516.

Figure 17:
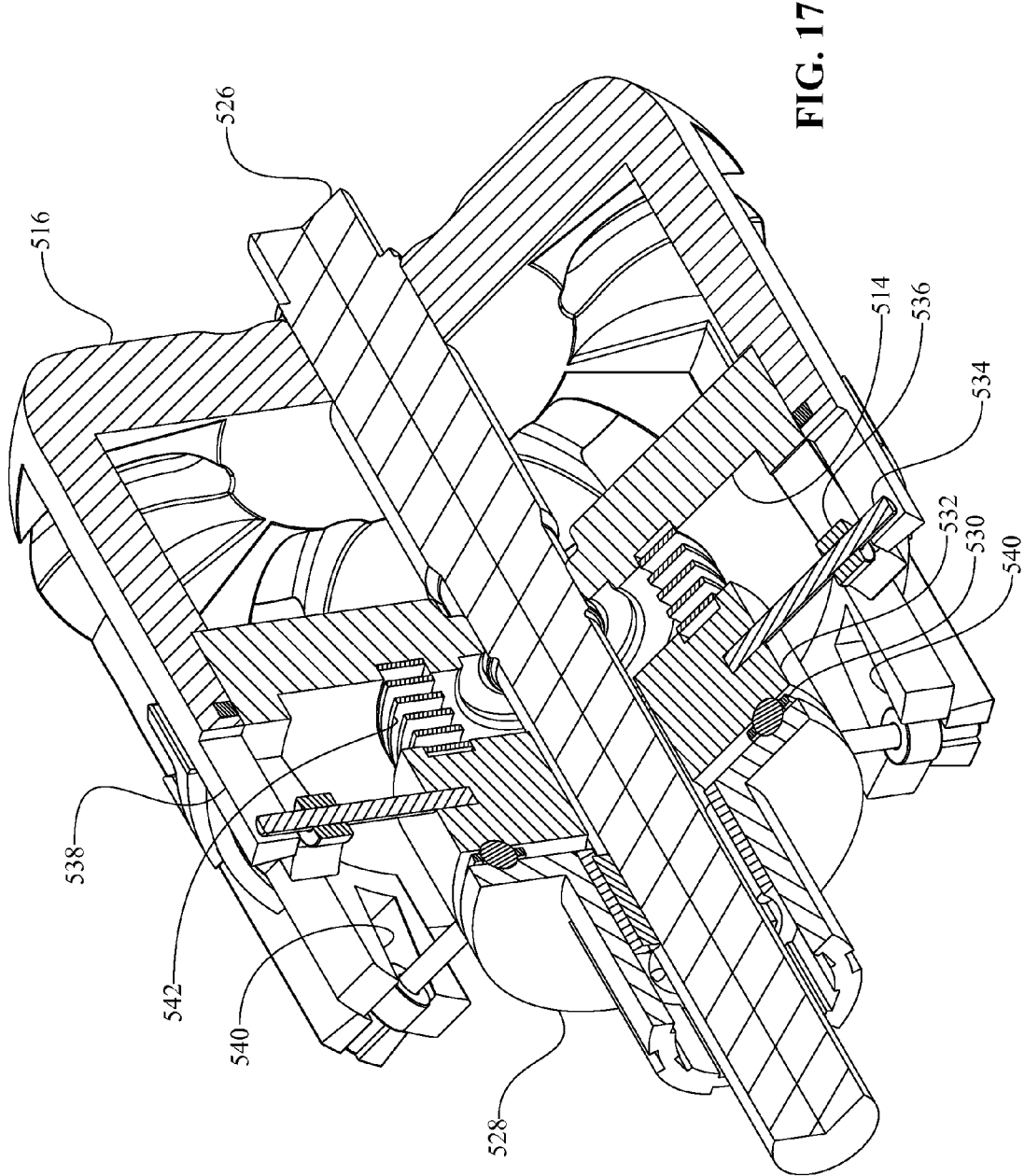
FIG. 17 is a partially cross-sectioned perspective view of certain internal shifting components of the IVT of FIG. 16.
Figure 19:
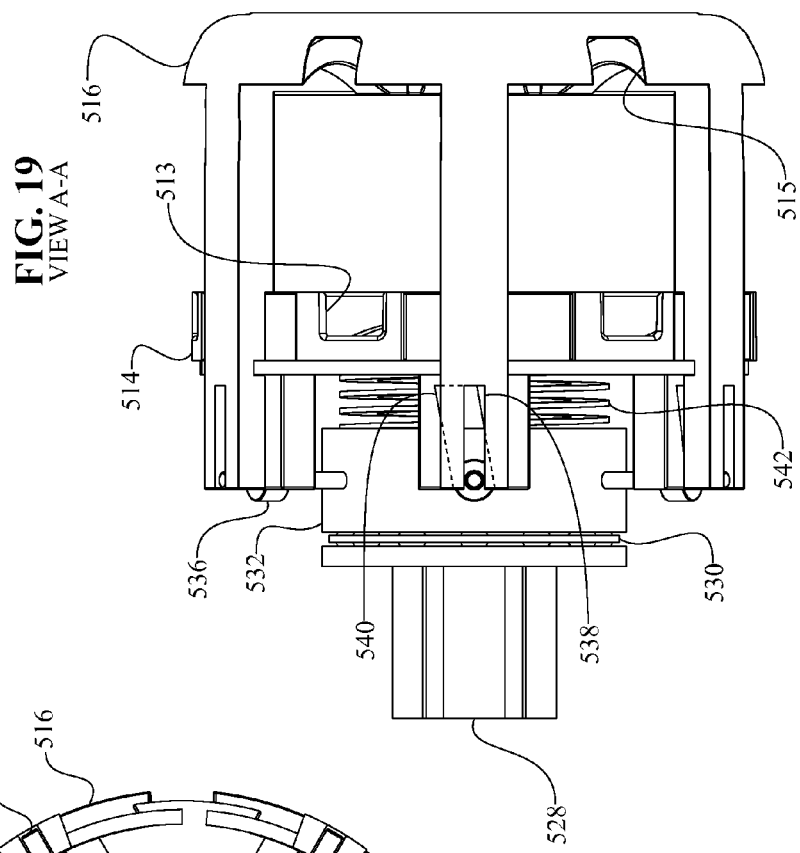
FIG. 19 is a plan view A-A of the internal shifting components of FIG. 18.
Figure 18:
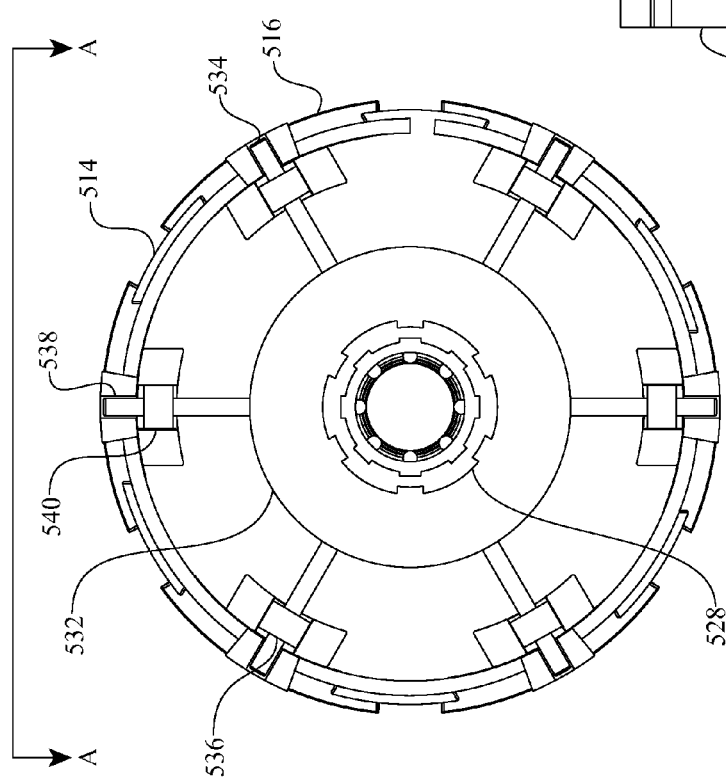
FIG. 18 is a plan view of the internal shifting components of FIG. 17.

Referring now specifically to FIGS. 17-19, the carrier driver hub 532 can be provided with a number of rods 534 extending from a substantially cylindrical body. Each of the rods 534 is provided with a roller 536. The rods 534 engage a number of longitudinal slots 538 formed on the second carrier member 516. The rollers 536 engage a number of longitudinal slots 540 formed on the first carrier member 514. The longitudinal slots 538 are substantially parallel with the longitudinal axis of IVT 500. The longitudinal slots 540 are angled with respect to the longitudinal axis of IVT 500 when viewed in the plane of the page of FIG. 19.

During operation of the IVT 500, a change in transmission ratio is achieved by axially translating the actuator coupling 528. The axial translation of the actuator coupling 528 tends to axially translate the carrier driver hub 532. As the carrier driver hub 532 translates axially, the rods 534 and rollers 536 axially translate along the longitudinal slots 538, 540, respectively. Since the longitudinal slots 540 are angled with respect to the longitudinal slots 540, an axial translation of the rods 534 and rollers 536 causes a relative rotation between the first carrier member 514 and the second carrier member 516, and thereby tends to change the ratio of the IVT 500. In some embodiments, the IVT 500 can be provided with a spring 542 configured to urge the carrier driver hub 532 to one axial end of the IVT 500.

Figure 20:
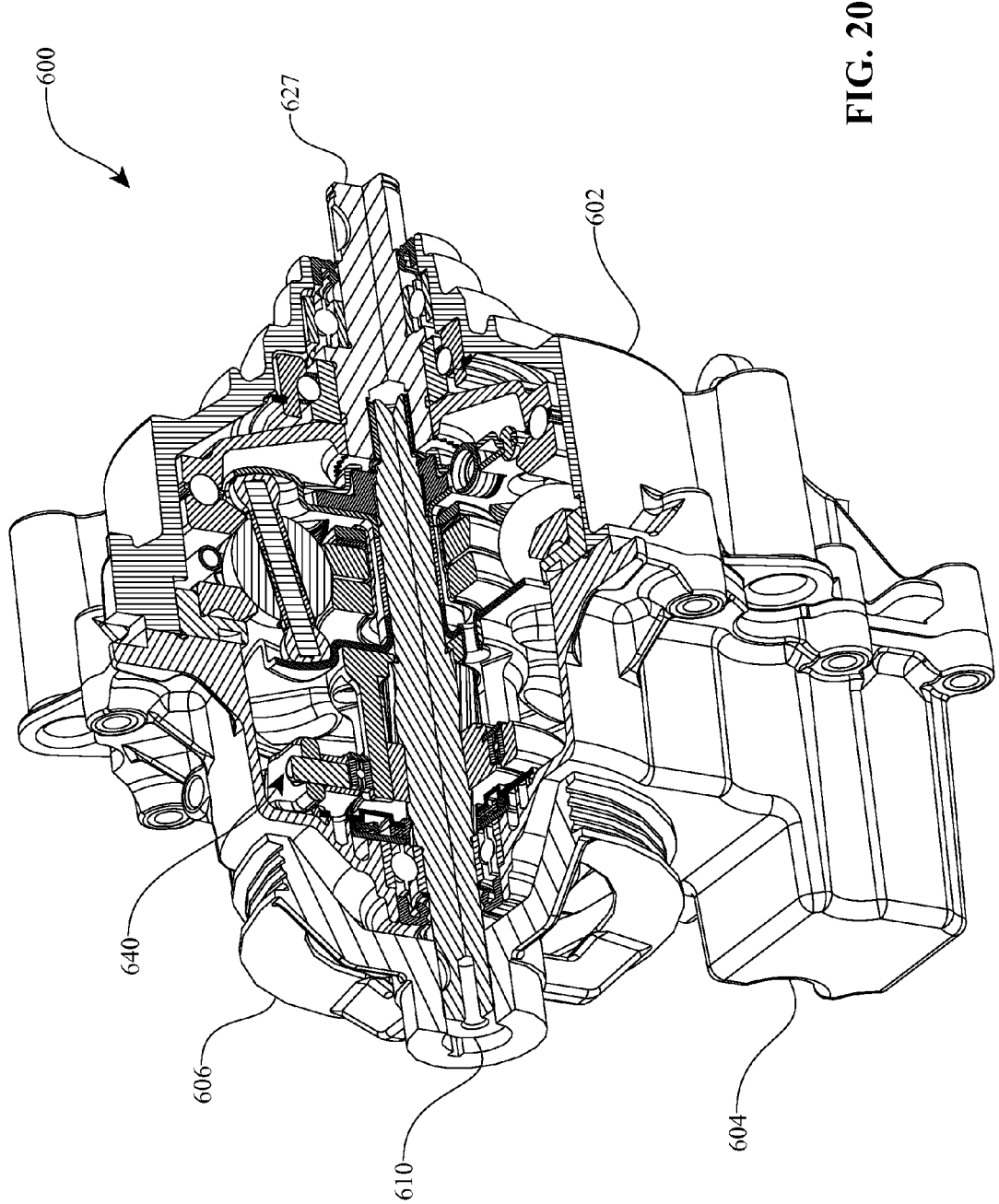
FIG. 20 is a partially cross-sectioned perspective view of one embodiment of an IVT having a skew-based control system.
Figure 21:
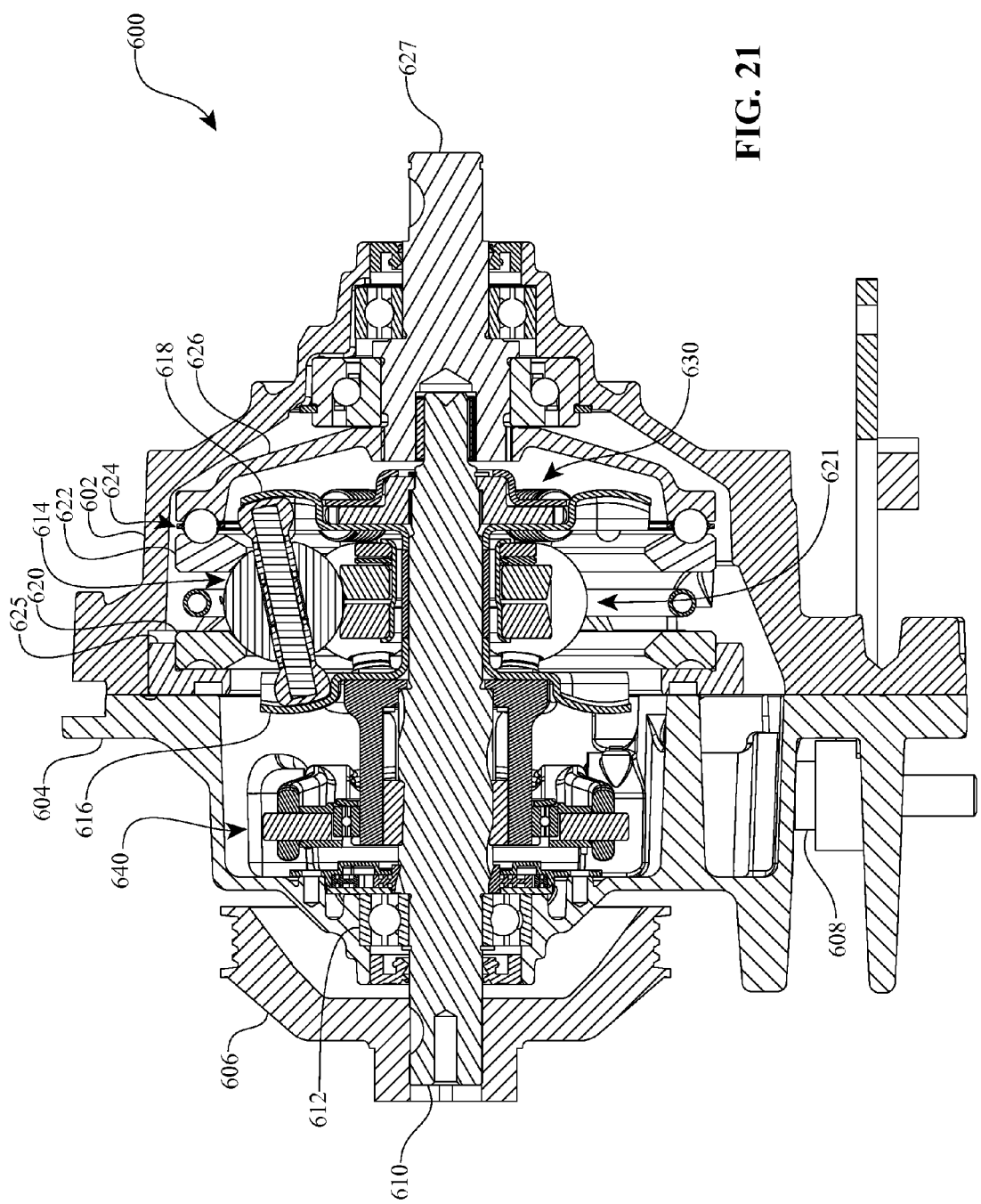
FIG. 21 is a cross-sectional view of the IVT of FIG. 20.

Referring now to FIGS. 20 and 21, in one embodiment an IVT 600 includes a housing 602 coupled to a housing cap 604. The housing 602 and the housing cap 604 support a power input interface such as a pulley 606 and a shift actuator 608. The pulley 606 can be coupled to a drive belt driven by a source of rotational power such as an internal combustion engine (not shown). In one embodiment, the IVT 600 is provided with a main shaft 610 that substantially defines a longitudinal axis of the IVT 600. The main shaft 610 couples to the pulley 606. The IVT 600 includes a plurality of traction planet assemblies 614 coupled to first and second carrier members 616, 618, respectively. The first and second carrier members 616, 618 are provided with guide slots that are substantially similar to the guide slots 170 and the radially offset guide slots 174. In one embodiment, the first and second carrier members 616, 618 have a thin and substantially uniform cross-section when viewed in the plane of the page of FIG. 21, which allows various manufacturing techniques, such as sheet metal stamping, to be employed in the manufacture of the first and second carrier members 616, 618.

Still referring to FIGS. 20 and 21, in one embodiment, the main shaft 610 couples to the first carrier member 616. Each traction planet assembly 614 is in contact with first and second traction rings 620, 622, respectively. Each traction planet assembly 614 is in contact with an idler assembly 621 at a radially inward location. The second traction ring 622 couples to an axial force generator 624. The axial force generator 624 couples to an output driver 626. In one embodiment, the first traction ring 620 couples to a ground ring 625 and is substantially non-rotatable with respect to the housing 602. The IVT 600 has an output shaft 627 coupled to the output driver 626. The output shaft 627 delivers a rotational power from the IVT 600. In one embodiment, the output shaft 627 is supported in the housing 602 by an angular contact bearing 628 and a radial ball bearing 629 (see for example, FIG. 23). In some embodiments, a shaft seal 631 can be coupled to the output shaft 627 and the housing 602.

In some embodiments, the IVT 600 can be provided with a torque limiter 630 that couples to the second carrier member 618 and the main shaft 610. The IVT 600 can also be provided with a pump assembly 635 coupled to the main shaft 610 (see for example, FIG. 22). In one embodiment, the pump assembly 635 can use a gerotor type pump to pressurize transmission fluid and distribute it to internal components of the IVT 600. The pump assembly 635 can be appropriately equipped with hoses and/or lines to route transmission fluid. During operation of the IVT 600, the pump assembly 635 is driven by the main shaft 610.

Figure 22:
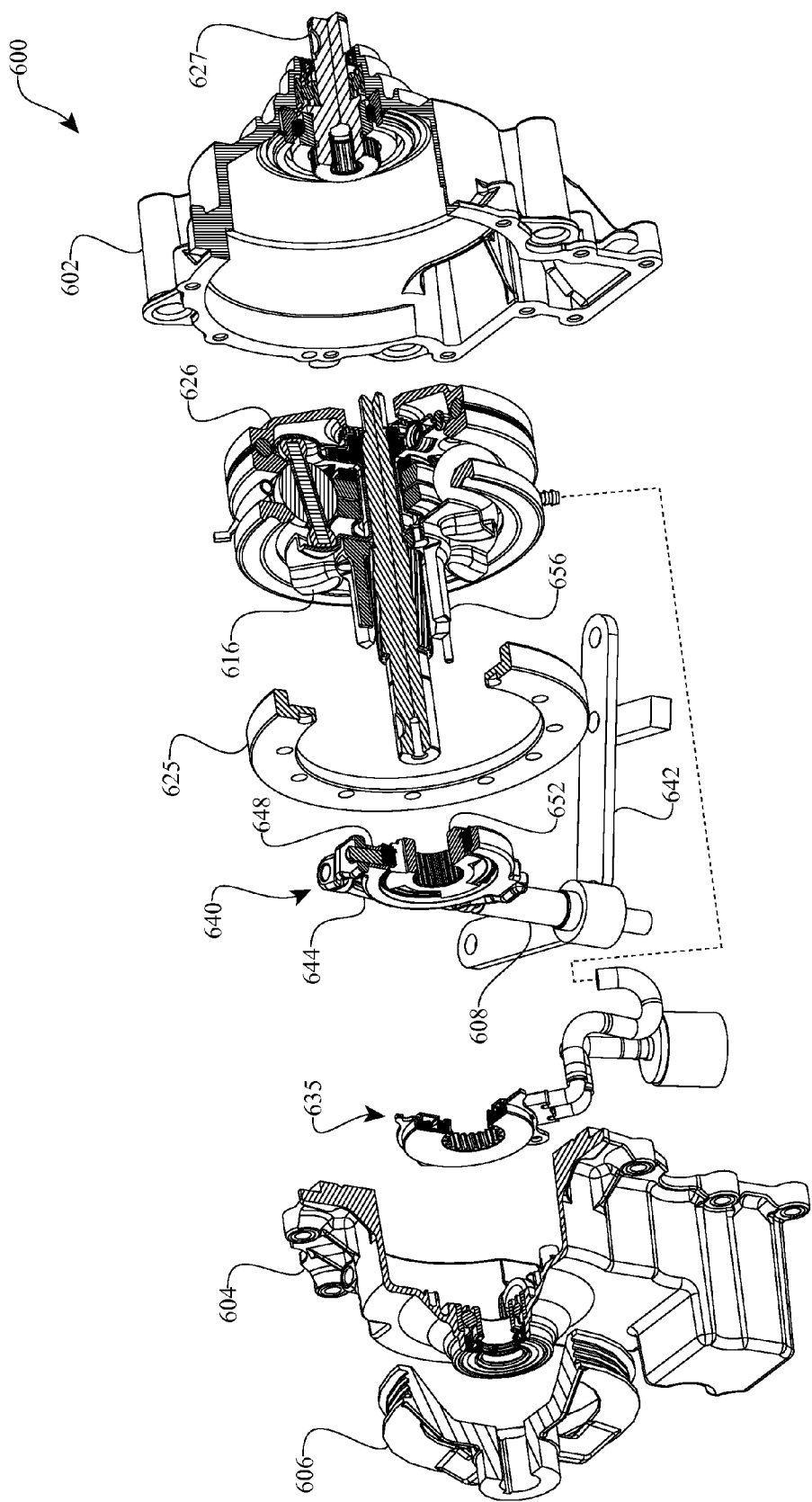
FIG. 22 is an exploded, cross-sectioned view of the IVT of FIG. 20.
Figure 23:
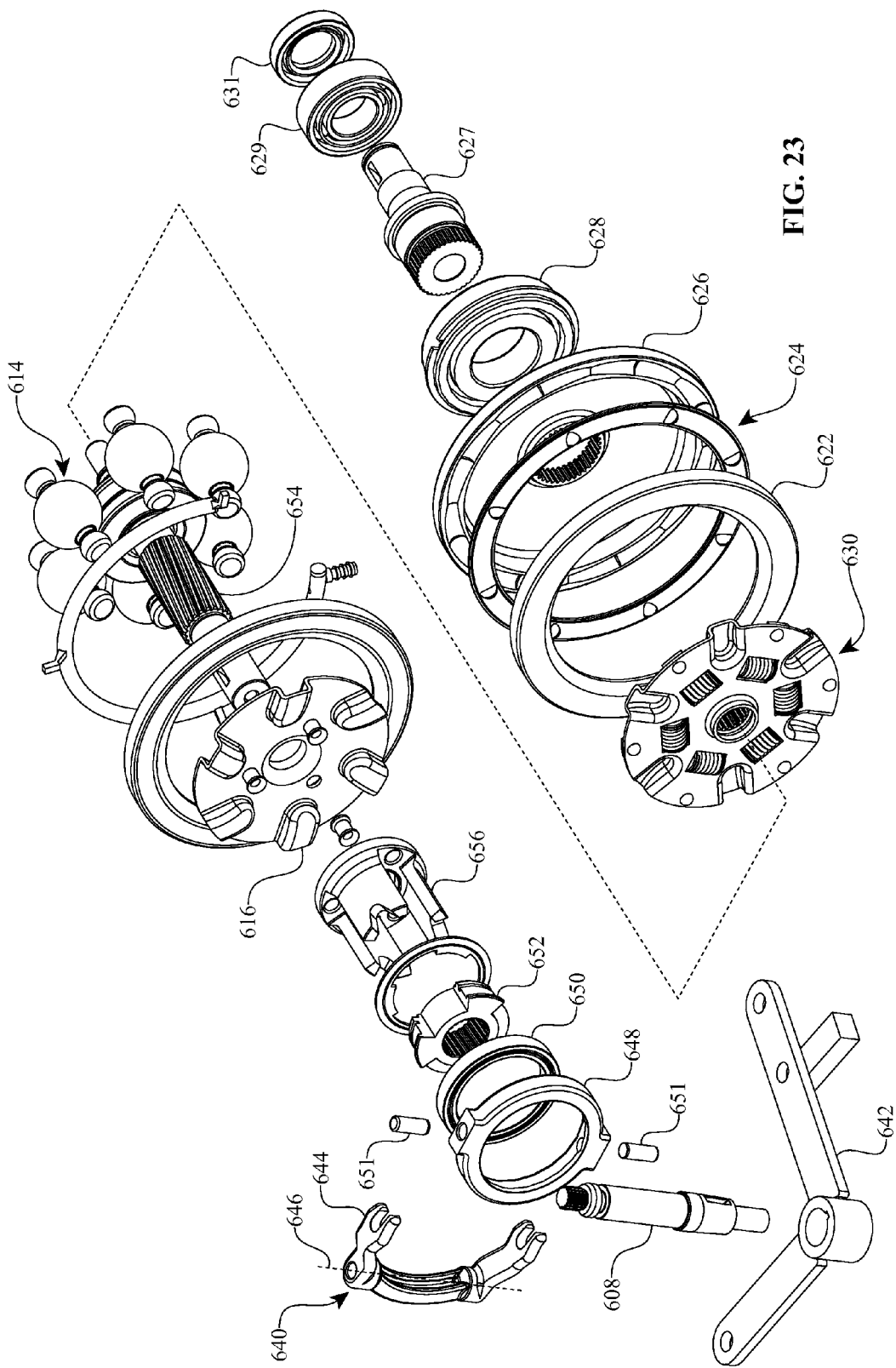
FIG. 23 is an exploded view of certain internal components of the IVT of FIG. 20.

Referring now to FIGS. 22 and 23, in one embodiment the IVT 600 is provided with a shift control mechanism 640. The shift control mechanism 640 can be used on other types of transmission and is shown here with the IVT 600 as an example. The shift control mechanism 640 can include an actuator linkage 642 coupled to the shift actuator 608. The shift actuator 608 can be coupled to a shift fork 644. In one embodiment, the shift actuator 608 is configured to pivot the shift fork 644 about an axis 646. In one embodiment, the axis 646 is offset from the longitudinal axis of the IVT 600. The shift fork 644 can be supported in the housing cap 604. The shift fork 644 can be coupled to a shift collar 648. The shift collar 648 supports a bearing 650. The shift fork 644 and the shift collar 648 can be coupled, for example, with pins 651. The shift fork 644 and the shift collar 648 are substantially non-rotatable about the longitudinal axis of the IVT 600. In one embodiment, the shift control mechanism 640 includes a carrier driver nut 652. The carrier driver nut 652 couples to the main shaft 610 through a set of helical splines 654. The carrier driver nut 652 couples to the first carrier member 616 through a carrier extension 656. In one embodiment the carrier extension 656 has a set of axial guide slots that are configured to engage the carrier driver nut 652.

During operation of the IVT 600, a shift in the transmission ratio can be achieved by moving the actuator linkage 642 to thereby rotate the shift actuator 608. A rotation of the shift actuator 608 corresponds to pivoting of the shift fork 644 about the axis 646. The pivoting of the shift fork 644 urges the shift collar 648 axially with respect to the main shaft 610. The shift collar 648 thereby axially translates the bearing 650 and carrier driver nut 652. The helical splines 654 tend to rotate the carrier driver nut 652 as the carrier driver nut 652 moves axially. The rotation of the carrier driver nut 652 is typically a small angle. The carrier extension 656, and consequently the first carrier member 616, is guided through a rotation by the carrier driver nut 652. As explained previously in reference to FIG. 6, a rotation of the first carrier member 616 with respect to the second carrier member 618 causes a shift in the transmission ratio of the IVT 600.

In one embodiment, the helical splines 654 have a lead in the range of 200-1000 mm. For some applications, the lead is in the range of 400-800 mm. The lead is related to how much friction is in the system that can counteract a phenomenon known as back torque shifting. The lead can be sized to reduce the input force on the carrier driver nut 652, the required rotation of the first carrier member 616 to shift through the ratio, and available package space. The sizing of the lead is subject to design requirements, and could also be impacted by testing results.

Figures 24, 25:
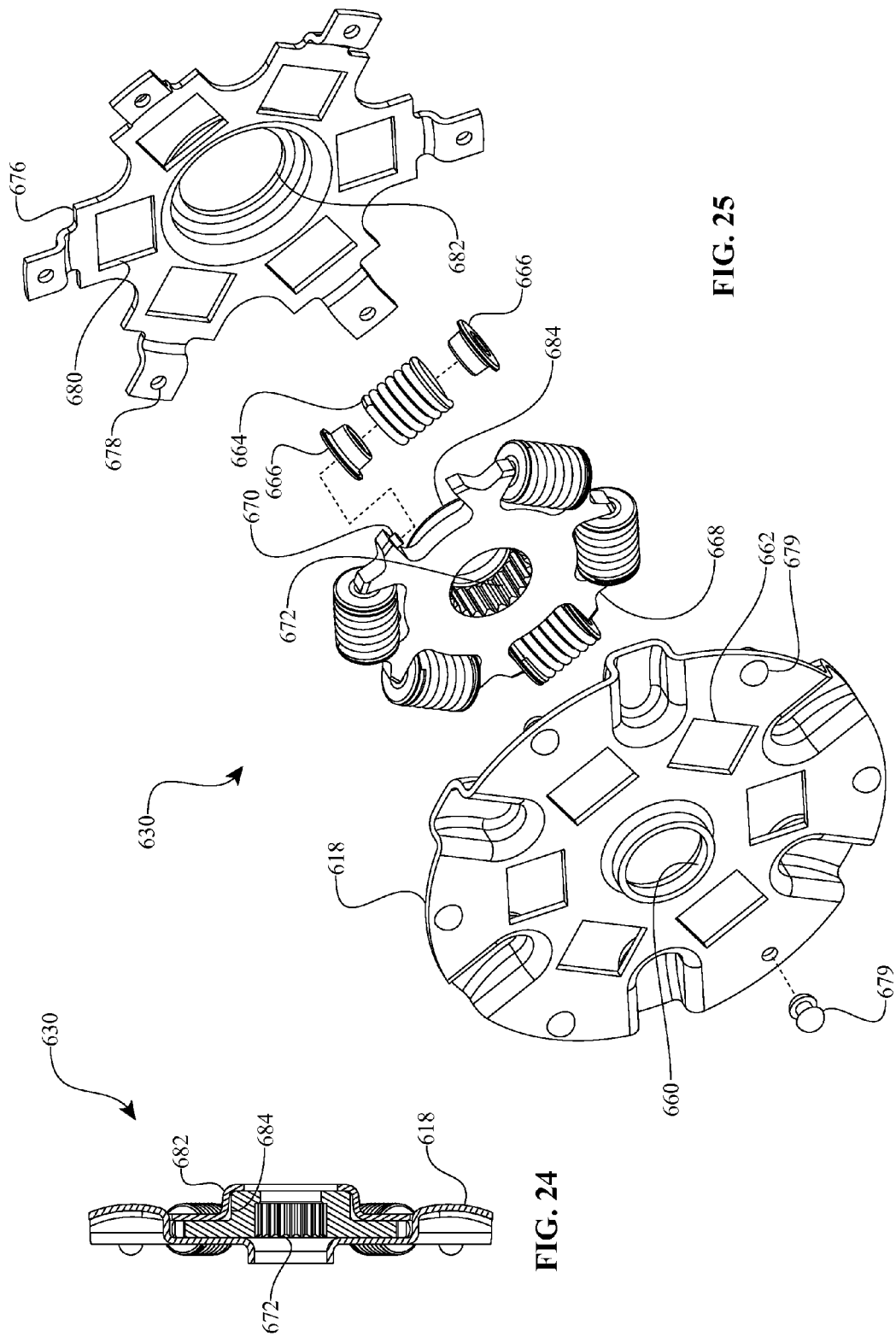
FIG. 24 is a cross-sectional view of a torque limiter that can be used with the IVT of FIG. 20.
FIG. 25 is an exploded view of the torque limiter of FIG. 24.
Figure 27:
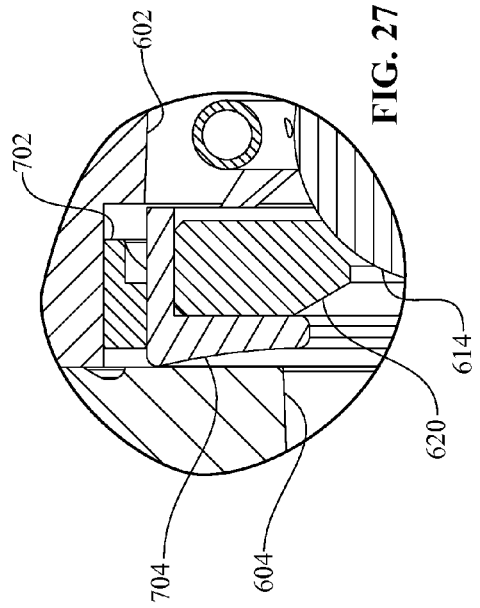
FIG. 27 is a cross-sectional view of the disengagement mechanism of FIG. 26.
Figure 28:
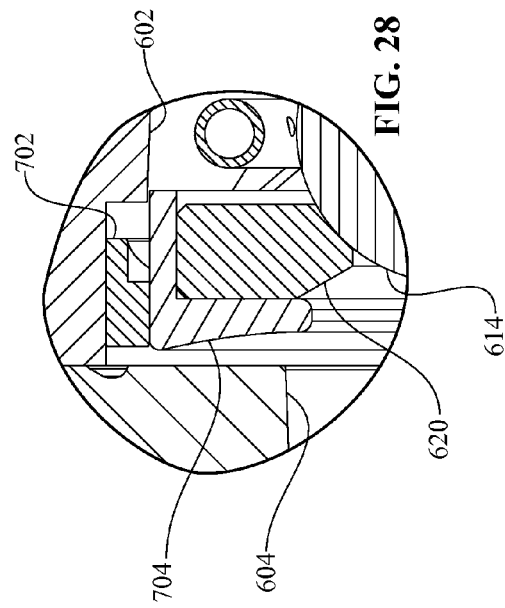
FIG. 28 is another cross-sectional view of the disengagement mechanism of FIG. 26.
Figure 26:
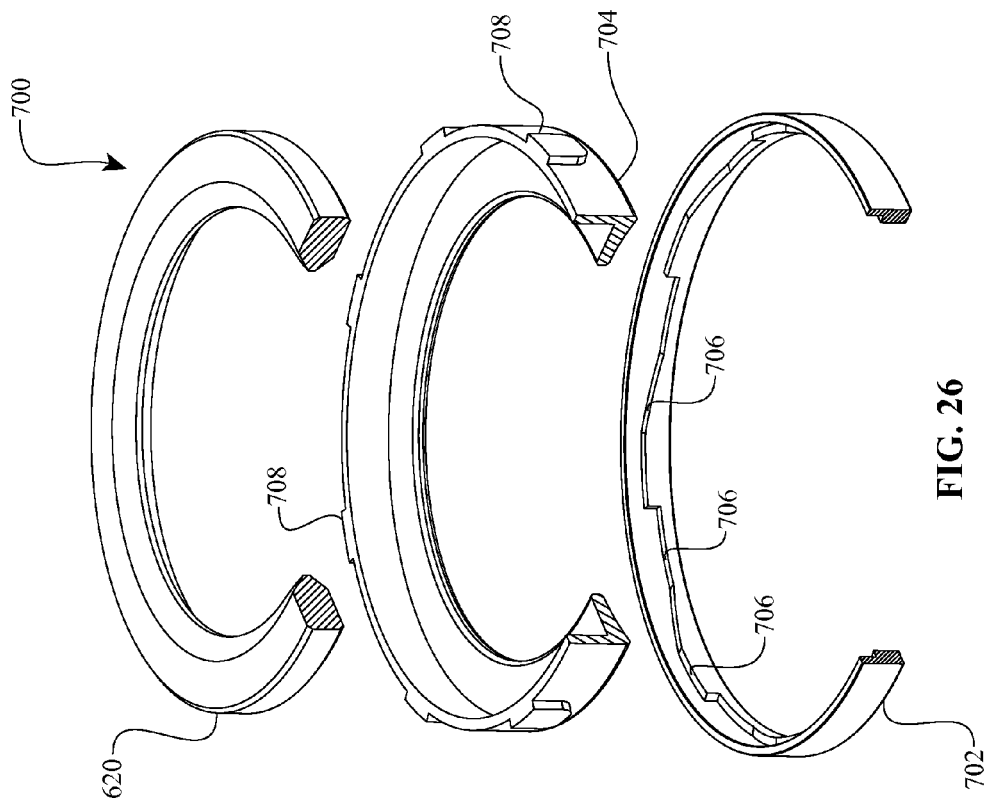
FIG. 26 is partially cross-sectioned view of a disengagement mechanism that can be used with the IVT of FIG. 20.

Turning now to FIGS. 24 and 25, in one embodiment the IVT 600 can be provided with a torque limiter 630 coupled to the second carrier member 618. The torque limiter 630 can be used with other types of transmissions and is shown here with the IVT 600 as an example. The second carrier member 618 is provided with a piloting shoulder 660 that is configured to pilot to the main shaft 610. The second carrier member 618 has a number of openings 662 arranged radially about the piloting shoulder 660. The openings 662 are sized appropriately to couple to a plurality of springs 664. In one embodiment, the springs 664 are coil springs having end caps 666. The torque limiter 630 includes a spring carrier 668. The springs 664 are coupled to the spring carrier 668. In some embodiments, a number of retaining dowels 670 are provided on the spring carrier 668 to mate with each end cap 666 in order to facilitate retaining the springs 664 on the spring carrier 668. The spring carrier 668 couples to the main shaft 610 with a splined inner bore 672.

In one embodiment, the torque limiter 630 includes a carrier cap 676 coupled to the second carrier member 618. In some embodiments, the spring carrier 668 is axially located between the second carrier member 618 and the carrier cap 676. The carrier cap 676 can be provided with a number of tabs 678 to facilitate attachment to the second carrier member 618 with, for example, rivets 679. The carrier cap 676 can be provided with a number of openings 680 arranged radially about a piloting shoulder 682. In one embodiment, the piloting shoulder 682 cooperates with a mating shoulder 684 formed on the spring carrier 668.

During operation of the IVT 600, torque can be limited to a predetermined value by using the torque limiter 630. The main shaft 610 is adapted to receive a rotational power from the pulley 606. The rotational power is transferred to the first carrier member 616 and the spring carrier 668. The spring carrier 668 transfers the rotational power to the second carrier member 618 via the springs 664. The springs 664 are sized appropriately so that the springs 664 deflect when an output torque is above a predetermined value or in the case when a torque on the second carrier member 618 is above a predetermined value. The deflection of springs 664 corresponds to a rotation of the second carrier member 618 with respect to the first carrier member 616 thereby shifting the transmission ratio. The shift in transmission ratio reduces the torque on the second carrier member 618.

Turning now to FIGS. 26-29, in one embodiment, the IVT 600 can be provided with a disengagement mechanism 700. The disengagement mechanism 700 can be used with other types of transmissions and is shown here with the IVT 600 as an example. In one embodiment, the disengagement mechanism 700 includes a outer ring 702 coupled to a coupling ring 704. The coupling ring 704 is attached to the traction ring 620. In some embodiments, the outer ring 702 and the coupling ring 704 replace the ground ring 625. The outer ring 702 couples to the housing 602 and housing cap 604. In some embodiments, an actuator (not shown) couples to the outer ring 702. For example, the actuator can be a lever (not shown) that extends through the housing 602 to thereby enable the outer ring 702 to be rotated. The outer ring 702 is provided with a number of ramps 706 about the inner circumference. The ramps 706 couple to a set of splines 708 formed on the outer periphery of the inner ring 704. During operation of the IVT 600, decoupling of the input from the output can be achieved by rotating the outer ring 706. The rotation of the outer ring 706 corresponds to an axial displacement of the traction ring 620 from the traction planet assemblies 614.

Passing now to FIGS. 29-30, in one embodiment, the IVT 600 can be provided with a disengagement mechanism 800. The disengagement mechanism 800 can be used with other types of transmissions and is shown here with the IVT 600 as an example. In some embodiments, the disengagement mechanism 800 has a drive shaft 802 that can be selectively coupled to an output shaft 804 using a coupling 806. Once assembled the drive shaft 802 and the output shaft 804 can be used in place of the output shaft 627. The coupling 806 is configured to engage a set of splines 808 formed on an inner diameter of the output shaft 804. In some embodiments, a spring (not shown) can be inserted between the coupling and the output shaft 804. The spring tends to bias the coupling 806 to the position depicted in FIG. 29, which is an engaged position. The coupling 806 is attached to a cable pull 810. The cable pull 810 can be supported on an internal bore of the coupling 806 by a bearing 812. The cable pull 810 can be attached to a push-pull cable (not shown). The cable can be coupled to an external linkage that can be actuated to tension the cable and move the coupling 806 axially. A cable guide 814 provides a path through which the cable can enter the inner bore of the output shaft 814 without interference. The cable guide 814 is supported with a bearing 816. During operation of the IVT 600, the output shaft 804 can be selectively coupled to an engaged position, as illustrated in FIG. 30, by tensioning the cable (not shown) and axially translating the coupling 806.

Referring now to FIGS. 31-34, in one embodiment, the IVT 600 can be provided with a disengagement mechanism 900. The disengagement mechanism 900 can be used with other types of transmissions and is shown here with the IVT 600 as an example. In one embodiment, the disengagement mechanism 900 can replace the output shaft 627. The disengagement mechanism 900 can include an elongated shaft 902 suitably configured to be supported in the housing 602 by bearings 628, 629 and seal 630. The elongated shaft 902 can have a first end 901 and a second end 903. The first end 901 can be adapted to couple to an output load with, for example, a keyway or other fastening means. The second end 903 of the shaft 902 is provided with a number of retractable teeth 904. The retractable teeth 904 are positioned radially about the circumference of the end 903. The retractable teeth 904 can be inserted between, and retained by axial extensions 906 formed on the end 903. The retractable teeth 904 are operably coupled to a sliding member 908. The sliding member 908 is coupled to an actuator coupling 910. The sliding member 908 guides the retractable teeth 904 to either an engaged position or a disengaged position. In one embodiment, the retractable teeth can 904 can be coupled to a spring member (not shown) that is configured to bias the retractable teeth 904 to a position depicted in FIGS. 31 and 32. In said position, the retractable teeth 904 can engage, for example, the output driver 626. An actuator (not shown) can be configured to couple to the actuator coupling 910 through an inner bore of the shaft 902 to facilitate movement of the sliding member 908 and correspondingly move the teeth 904 to a second position depicted in FIGS. 33 and 34. In said position, the teeth 904 are displaced radially so that the output driver 626 is decoupled from the shaft 902.

Figure 35:
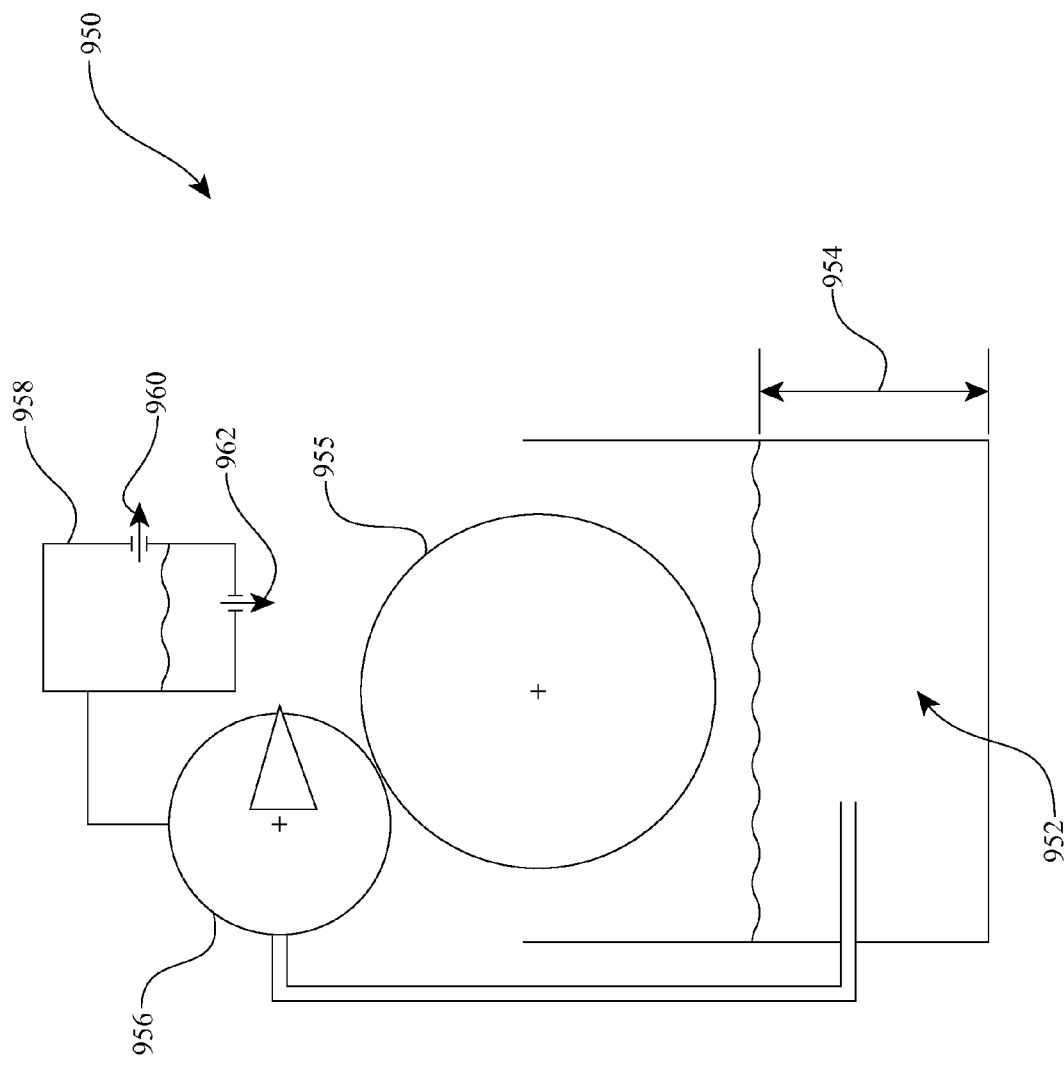
FIG. 35 is a schematic depicting a hydraulic system that can be used with the IVT of FIG. 20.

Turning now to FIG. 35, in one embodiment, a hydraulic system 950 can be used with the IVT 100, the IVT 600, or other embodiments of transmissions. The hydraulic system 950 includes a sump 952 having a fill depth 954. In some embodiments, the sump 952 is formed into a lower portion of the housing 602, for example. For illustration purposes, rotating components of the IVT 600 are depicted as rotating components 955 in FIG. 35. The hydraulic system 950 includes a pump 956 that can be substantially similar to the pump assembly 635, for example. The pump 956 transports fluid from the sump 952 to a reservoir 958. In one embodiment, the reservoir 958 is provided with a first orifice 960 and a second orifice 962. The first orifice 960 is positioned above the second orifice 960. The reservoir 958 is located above the rotating components 955 and the sump 952. In one embodiment, the reservoir 958 can be formed on the housing 602, for example. In other embodiments, the reservoir 958 is attached to the outside of the housing 602 and configured to have fluid communication with the rotating components 958 and the sump 952.

During assembly of the IVT 600, for example, a fluid is added to the sump 952. In some embodiments, the volume of the sump 952 can be small, therefore variation in the fluid volume added to the sump 952 can have a significant influence on the fill depth 954. In some instances, the fill depth 954 can be high enough to cause fluid in the sump 952 to contact the rotating components 955. Contact between the fluid in the sump 952 and the rotating components 955 can create drag and windage, which are known to be problematic. However, in certain instances, it may be desirable to increase the volume of fluid added to the sump 952. For example, increasing the volume of fluid may improve thermal characteristics, durability, and maintenance. Therefore, the hydraulic system 952 can be implemented to facilitate the increase in fluid volume added to the sump 952 and maintain a fill depth 954 below the rotating components 955.

During operation of the IVT 600, for example fluid is drawn from the sump 952 by the pump 956, which lowers the fill depth 954. The fluid is pressurized and delivered by the pump 956 to the reservoir 958. The reservoir 958 receives pressurized fluid and fills the volume of the reservoir 958. The first and second orifices 960, 962 are sized appropriately so that once the reservoir 958 is under pressure, fluid can flow from the first orifice 960 while substantially no fluid flows from the second orifice 962. In some embodiments, the second orifice 962 can be a check valve that is configured to be open when the reservoir 958 is depressurized, and closed when the reservoir 958 is pressurized. The fluid flow from the first orifice 960 is directed to the rotating components 955 to provide lubrication and cooling. During operation of the IVT 600, for example, the reservoir 958 accumulates a volume of fluid. Once operation of the IVT 600 ceases, the accumulated volume drains from the reservoir 958 and returns to the sump 952.

Figure 38:
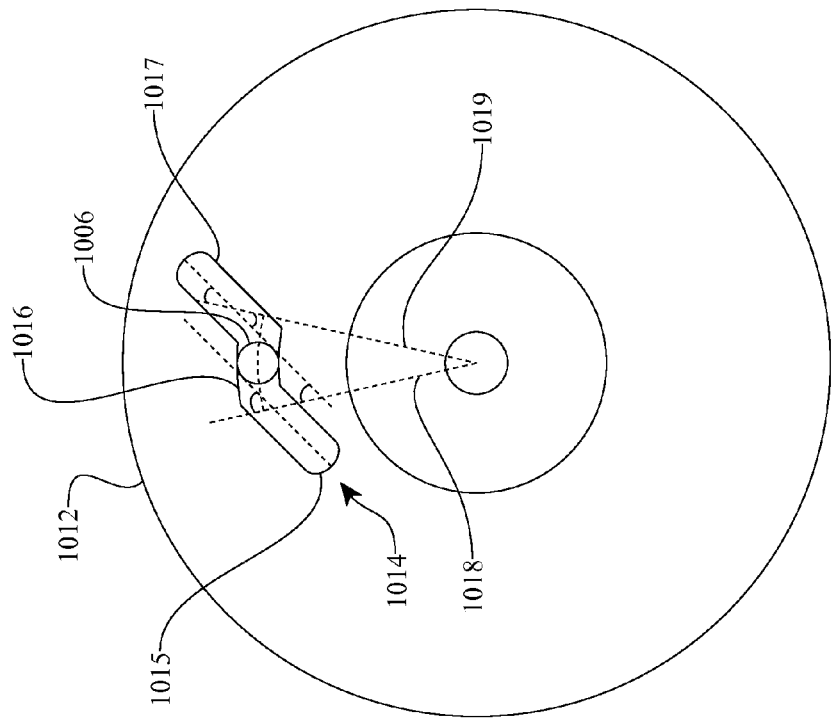
FIG. 38 is a plan view of a carrier that can be used with the IVT of FIG. 36.
Figure 36:
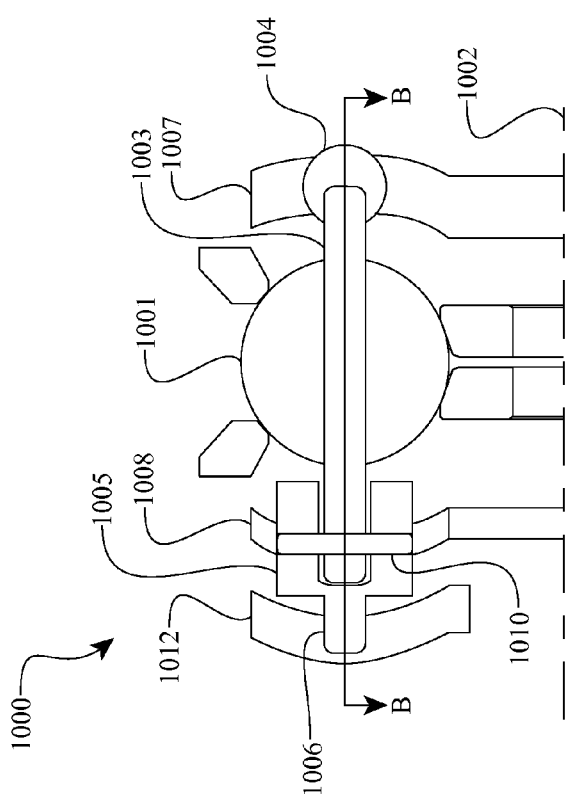
FIG. 36 is a cross-sectional view of one embodiment of an IVT having a skew-based control system.
Figure 37:
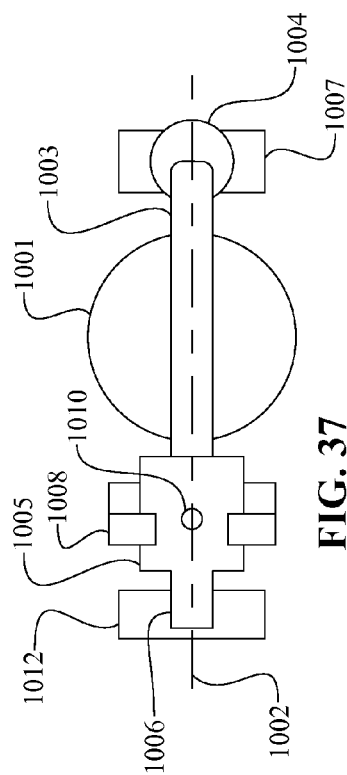
FIG. 37 is a plan view B-B of certain components of the IVT of FIG. 36.

Referring now to FIGS. 36-38, in one embodiment an IVT 1000 can be substantially similar to the IVT 100. For clarity, only certain internal components of the IVT 1000 are shown. In one embodiment, the IVT 1000 includes a number of balls 1001 arranged angularly about a longitudinal axis 1002. Each ball 1001 is configured to rotate about an axle 1003 that forms a tiltable axis. One end of the axle 1003 is provided with a spherical roller 1004. An opposite end of the axle 1003 is coupled to a guide block 1005 with, for example, a pin 1010.

In one embodiment, the guide block 1005 has an extension 1006. The IVT 1000 can include a first carrier member 1007 that is substantially similar to the carrier member 118. The first carrier member 1007 is configured to couple to the spherical rollers 1004 to provide the axles 1003 with a suitable degree of freedom. The IVT 1000 can include a second carrier member 1008 that is configured to operably couple to the guide blocks 1005. The IVT 100 is provided with a shifting plate 1012 arranged coaxially with the first and second carrier members 1007, 1008. The shifting plate 1012 couples to the extensions 1006. In one embodiment, the shifting plate 1012 can be actuated with, for example, the shift control mechanism 140. The shifting plate 1012 is configured to rotate relative to the first and second carrier members 1007, 1008.

Referring specifically now to FIG. 38, in one embodiment, the shifting plate 1012 is provided with a number of slots 1014. The extensions 1006 couple to the slots 1014. For illustration purposes, only one of the slots 1014 is shown. The slot 1014 can be illustrated as having three portions: a first portion 1015, a middle portion 1016, and a third portion 1017. The middle portion 1016 can be defined as the arc length between a set of radial construction lines 1018, 1019, respectively. The first portion 1015 and the third portion 1017 are angularly off-set from the radial construction lines 1018, 1019, respectively, in a substantially similar way as the radially off-set slots guide slots 174 are offset from the radial construction line 76. During operation of the IVT 1000, a change in transmission ratio can be achieved by rotating the shifting plate 1012 with respect to the first and second carrier members 1007, 1008. The extensions 1006 are guided by the slots 1014. When the extension 1006 is positioned in the first portion 1015 of the slot 1014, the transmission ratio can be a forward or positive ratio. When the extension 1006 is positioned in the third portion 1017 of the slot 1014, the transmission ratio can be a reverse or negative ratio. When the extension 1006 is positioned in the middle portion 1016, the transmission ratio is in neutral or a condition referred to as "powered-zero." The dimensions of the slot 1014 can be appropriately sized to accommodate a desired relationship between a change in the transmission ratio and a change in, for example, a change in an actuator position.

It should be noted that the description above has provided dimensions for certain components or subassemblies. The mentioned dimensions, or ranges of dimensions, are provided in order to comply as best as possible with certain legal requirements, such as best mode. However, the scope of the inventions described herein are to be determined solely by the language of the claims, and consequently, none of the mentioned dimensions is to be considered limiting on the inventive embodiments, except in so far as any one claim makes a specified dimension, or range of thereof, a feature of the claim.

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated.

What we claim is:

1. A shifting mechanism for an infinitely variable transmission (IVT) having a longitudinal axis and a plurality of traction planet assemblies arranged angularly about the longitudinal axis, the shifting mechanism comprising:
    a first carrier member coupled to each of the traction planet assemblies, the first carrier member configured to guide the traction planet assemblies;
    a second carrier member coupled to each of the traction planet assemblies, the second carrier member configured to guide the traction planet assemblies, wherein the first and second carrier members are rotatable about the longitudinal axis; and
    a carrier driver nut coupled to the first carrier member, the carrier driver nut adapted to translate axially, wherein an axial translation of the carrier driver nut corresponds to a rotation of the first carrier member with respect to the second carrier member.

2. The shifting mechanism of claim 1, wherein the first carrier member is provided with a plurality of radially off-set slots.

3. The shifting mechanism of claim 2, further comprising a main shaft positioned along the longitudinal axis.

4. The shifting mechanism of claim 3, wherein the main shaft is operably coupled to the first and second carrier members.

5. The shifting mechanism of claim 4, wherein the main shaft is provided with a plurality of helical splines.

6. The shifting mechanism of claim 5, wherein the carrier driver nut is adapted to translate axially along the main shaft.

7. The shifting mechanism of claim 6, wherein the carrier driver nut is coupled to the helical splines.

8. An infinitely variable transmission (IVT) having a longitudinal axis, the IVT comprising:
    a plurality of traction planet assemblies arranged angularly about the longitudinal axis;
    a first carrier member coupled to each of the traction planet assemblies, the first carrier member provided with a plurality of radially off-set slots, the first carrier member configured to guide the traction planet assemblies;
    a second carrier member coupled to each of the traction planet assemblies, the second carrier member provided with a plurality of radial slots, wherein the first and second carrier members are configured to receive a rotational power input, wherein the first carrier member is capable of rotating with respect to the second carrier member; and
    a carrier driver nut coupled to the first carrier member, the carrier driver nut adapted to translate axially, wherein an axial translation of the carrier driver nut corresponds to a rotation of the first carrier member with respect to the second carrier member.

9. The IVT of claim 8, further comprising a main shaft positioned along the longitudinal axis.

10. The IVT of claim 9, wherein the main shaft is operably coupled to the first and second carrier members.

11. The IVT of claim 10, wherein the main shaft is provided with a plurality of helical splines.

12. The IVT of claim 11, wherein the carrier driver nut is adapted to translate axially along the main shaft.

13. A method of controlling an infinitely variable transmission (IVT) having a longitudinal axis, the method comprising the steps of:
    providing a plurality of traction planet assemblies arranged angularly about the longitudinal axis;
    providing a first carrier member coupled to each traction planet assembly, the first carrier member having a plurality of radially off-set guide slots arranged to guide the traction planet assemblies;

providing a second carrier member coupled to each traction planet assembly, the second carrier member having a plurality of radial guide slots arranged to guide the traction planet assemblies;

coupling the first and second carrier members to a rotational power source;

providing a carrier driver nut coupled to the first carrier member; and translating the carrier driver nut along the longitudinal axis.

14. The method of claim 13, wherein the translating of the carrier driver nut comprises the step of rotating the first carrier member with respect to the second carrier member.

15. The method of claim 13, further comprising the step of operably coupling the carrier driver nut to a shift fork.

16. The method of claim 13, further comprising the step of coupling a torque limiter to the second carrier member.

17. The method of claim 16, further comprising the step of coupling the torque limiter to the rotational source of power.

18. The method of claim 13, further comprising the step of sensing a torque applied to the second carrier member.

19. The method of claim 18, further comprising the step of rotating the second carrier member based at least in part on the sensed torque.

20. The method of claim 19, wherein rotating the second carrier member includes the step of adjusting the transmission ratio.

\* \* \* \* \*